(12) United States Patent
Chang et al.

(10) Patent No.: US 9,749,172 B2
(45) Date of Patent: Aug. 29, 2017

(54) CALIBRATION METHOD AND CALIBRATION APPARATUS FOR CALIBRATING MISMATCH BETWEEN FIRST SIGNAL PATH AND SECOND SIGNAL PATH OF TRANSMITTER/RECEIVER

(71) Applicant: Realtek Semiconductor Corp., HsinChu (TW)

(72) Inventors: Yuan-Shuo Chang, Taoyuan (TW); Ching-Chia Cheng, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 14/724,781

(22) Filed: May 28, 2015

(65) Prior Publication Data

US 2015/0350000 A1 Dec. 3, 2015

(30) Foreign Application Priority Data

May 29, 2014 (TW) .............................. 103118848 A

(51) Int. Cl.
*H04L 27/36* (2006.01)
*H04B 17/21* (2015.01)
*H04B 17/12* (2015.01)
*H04L 27/38* (2006.01)

(52) U.S. Cl.
CPC ........... *H04L 27/364* (2013.01); *H04B 17/12* (2015.01); *H04B 17/21* (2015.01); *H04L 27/3863* (2013.01)

(58) Field of Classification Search
CPC ............... H04L 27/364; H04L 27/3863; H04L 27/2636; H04L 2027/0016; H04B 17/12; H04B 17/21; H04B 1/30
See application file for complete search history.

(56) References Cited

U.S. PATENT DOCUMENTS

| 7,856,048 B1 * | 12/2010 | Smaini ..................... H04B 1/40 330/2 |
| 8,280,327 B2 | 10/2012 | Hsu et al. |
| 2005/0260949 A1 * | 11/2005 | Kiss ....................... H04B 17/21 455/67.14 |

(Continued)

FOREIGN PATENT DOCUMENTS

TW 201002002 1/2010
TW 201236422 9/2012

*Primary Examiner* — Syed Haider
(74) *Attorney, Agent, or Firm* — Winston Hsu

(57) ABSTRACT

A method for calibrating mismatches of an in-phase signal path and a quadrature signal path of a receiver is proposed in the present invention, including: utilizing the receiver to receive at least one test signal with a specific frequency via the first signal path and the second signal path, to generate a first signal path received signal and a second signal path received signal; performing frequency analysis upon the first signal path received signal and the second signal path received signal respectively, to generate a first frequency analysis result and a second frequency analysis result; and calculating at least one calibration coefficient according to the first frequency analysis result and the second frequency analysis result. A method for calibrating mismatches of an in-phase signal path and a quadrature signal path of a transmitter is also proposed in the present invention.

10 Claims, 22 Drawing Sheets

(56) References Cited

U.S. PATENT DOCUMENTS

| | | | | |
|---|---|---|---|---|
| 2008/0253473 A1* | 10/2008 | Busson | ............... | H03D 7/166 375/295 |
| 2011/0228826 A1* | 9/2011 | Yokoo | ............... | H04L 27/0014 375/219 |
| 2011/0292978 A1* | 12/2011 | Kravitz | ............... | H04B 1/30 375/221 |
| 2012/0213266 A1* | 8/2012 | Su | ............... | H04B 17/0062 375/226 |

* cited by examiner

CALIBRATION METHOD AND CALIBRATION APPARATUS FOR CALIBRATING MISMATCH BETWEEN FIRST SIGNAL PATH AND SECOND SIGNAL PATH OF TRANSMITTER/RECEIVER

BACKGROUND OF THE INVENTION

1. Field of the Invention

The disclosed embodiments of the present invention relate to a calibration method and a related calibration circuit, and more particularly, to a calibration method and a related calibration apparatus for calibrating mismatches of an in-phase (I) signal path and a quadrature signal (Q) path of a transmitter/receiver.

2. Description of the Prior Art

In general, the modulation technique can comprise more information for data transmission when it is more complicated. That is, the modulation technique can increase transmission rate by complicated modulation process, such as the 64-Quadrature Amplitude Modulation (64-QAM), or even the 256-QAM. Thus, the requirement of high level modulation techniques is more and more popular. If a higher modulation scheme is used for delivering more information data, the Error Vector Magnitude (EVM) of the communication system has to be lower accordingly. One of the most important factors affecting the EVM is the level of an imbalance between the In-phase and Quadrature-phase signal paths (IQ imbalance) in modern communication transceivers. The main cause of the IQ imbalance comes from the circuit mismatch of IQ signal path in a Radio Frequency (RF) communication system. Even a small bias will affect the whole communication system, to form an incomplete orthogonal modulation/demodulation procedure, and result in increase of Bit Error Rate (BER) of the receiving terminal. The mismatch can be separated to the amplitude mismatch and the phase mismatch. As long as the mismatches exist, an image interference would appear at the symmetrical frequency of the original signal in the spectrum. Please refer to FIG. 1. FIG. 1 is a diagram illustrating a received signal received by a receiving terminal and an undesired image signal accompanying the received signal due to mismatch effect. The difference between the received signal amplitude and the image signal amplitude is called Image Rejection Ratio (IRR) in general. For example, when IQ imbalance is large, IRR will be small, and IQ imbalance is small, IRR will be large.

In order to improve the mismatch effect, a calibration will be performed for the circuit before transmitting/receiving signals formally, and the calibration is called IQ calibration. There are two main causes of the mismatches between the I and Q signal paths. One of the main causes is when a local oscillator (LO) generates carrier waves and transmits the carrier waves respectively to the mixers in the I signal path and the Q signal path, it is very hard to have a phase difference of exact 90 degrees, or the amplitudes of the carrier waves respectively transmitted to the mixers in the I signal path and the Q signal path are different (i.e., the above phase mismatch and amplitude mismatch). Another one of the main causes is that it is hard to avoid imperfect conditions in the circuit process, and thus two elements in the I signal path and the Q signal path are not totally matched to each other. For example, when there are mismatches between the low-pass filter (LPF) pair, the analog-to-digital converter (ADC) pair, the digital-to-analog converter (DAC) pair, or the gain amplifier in the I signal path and the Q signal path, the signals passing by the I signal path and the Q signal path will have difference. When the signals pass by the I and Q signal paths with mismatches, the image interference will be generated (as shown in FIG. 1) and reduce the signal quality.

In general, the prior art uses the searching method to approximate the optimal compensating value gradually to calibrate the image interference signals. However, the requirement for connecting speed is higher and higher in the wireless communication application nowadays. For example, if there is a phone call coming when a user uses a Bluetooth earphone, the Bluetooth earphone has to connect to the smartphone right away for user to take the phone call. The higher connecting speed can bring a better user experience. Thus, it is an important issue about how to perform the IQ calibration fast and accurately in the area of the communication system.

In addition, when the isolation between the local oscillator and radio-frequency circuit output is not perfect, the local oscillator signal leakage will occur to interfere the transmitting signals. In general, the prior art also uses the search-like method gradually tuning the parameters of compensation circuit to an optimal result to remove the local oscillator signal leakage. However, this method also has the disadvantage of slow speed. Thus, it is an important issue about how to compensate the local oscillator signal leakage fast and accurately in the area of the communication system.

SUMMARY OF THE INVENTION

It is therefore one of the objectives of the present invention to provide a calibration method and a related calibration apparatus for calibrating mismatches of an in-phase (I) signal path and a quadrature (Q) signal path of a transmitter/receiver, so as to solve the above-mentioned problem.

In accordance with a first embodiment of the present invention, an exemplary calibration method for calibrating mismatches of a first signal path and a second signal path of a receiver, wherein one of the first signal path and the second signal path is an in-phase signal path and the other one of the first signal path and the second signal path is a quadrature signal path is disclosed. The calibration method comprises: utilizing the receiver to receive at least a test signal via the first signal path and the second signal path respectively to generate a first signal path received signal and a second signal path received signal, wherein the test signal possesses a specific frequency; performing a spectrum analyzing operation for the first signal path received signal and the second signal path received signal respectively to generate a first spectrum analyzing result and a second spectrum analyzing result; and calculating at least a calibration coefficient according to the first spectrum analyzing result and the second spectrum analyzing result, so as to calibrate the mismatches between the first signal path and the second signal path of the receiver, wherein the test signal does not pass by the calibration coefficient to generate the first signal path received signal and the second signal path received signal.

In accordance with a second embodiment of the present invention, an exemplary calibration method for calibrating a transmitter, wherein one of the first signal path and the second signal path is an in-phase signal path and the other one of the first signal path and the second signal path is a quadrature signal path is disclosed. The calibration method comprises: additionally setting at least a calibration coefficient in the transmitter; setting the at least a calibration coefficient as at least a first eliminating value, and utilizing the transmitter to transmit a first test signal via the at least a calibration coefficient and via the first signal path and the second signal path to generate a first transmitting signal, wherein the first test signal has a specific frequency; loopbacking the first transmitting signal, and performing a spectrum analyzing operation on the first transmitting signal to generate a first spectrum analyzing result; setting the at least a calibration coefficient as at least a second eliminating value, and utilizing the transmitter to transmit a second test signal via the at least a calibration coefficient and via the first signal path and the second signal path to generate a second transmitting signal, wherein the second test signal has a specific frequency; loopbacking the first transmitting signal, and performing a spectrum analyzing operation on the second transmitting signal to generate a second spectrum analyzing result; and calculating the at least a target eliminating value according to the first eliminating value, the second eliminating value, the first spectrum analyzing result, and the second spectrum analyzing result, and setting the at least a calibration coefficient as the at least a target eliminating value.

In accordance with a third embodiment of the present invention, an exemplary calibration apparatus for calibrating mismatches of a first signal path and a second signal path of a receiver, wherein one of the first signal path and the second signal path is an in-phase signal path and the other one of the first signal path and the second signal path is a quadrature signal path is disclosed. The calibration apparatus comprises: a spectrum analyzing unit and a calibration coefficient calculating unit. The spectrum analyzing unit is utilized for performing a spectrum analyzing operation respectively for the first signal path received signal and the second signal path received signal respectively generated via the first signal path and the second signal path to generate a first spectrum analyzing result and a second spectrum analyzing result, wherein the test signal possesses a specific frequency. The calibration coefficient calculating unit is utilized for calculating at least a calibration coefficient according to the first spectrum analyzing result and the second spectrum analyzing result, so as to calibrate the mismatches between the first signal path and the second signal path of the receiver, wherein the test signal does not pass by the calibration coefficient to generate the first signal path received signal and the second signal path received signal.

In accordance with an embodiment of the present invention, an exemplary calibration apparatus for calibrating mismatches of a first signal path and a second signal path of a transmitter, wherein one of the first signal path and the second signal path is an in-phase signal path and the other one of the first signal path and the second signal path is a quadrature signal path is disclosed. The calibration apparatus comprises: a calibrating unit, a control unit, a spectrum analyzing circuit, and a calibration coefficient calculating unit. The calibrating unit comprises at least a calibration coefficient. The control unit is utilized for setting the at least a calibration coefficient as at least a first eliminating value, and utilizing the transmitter to transmit a first test signal via the at least a calibration coefficient and via the first signal path and the second signal path to generate a first transmitting signal, wherein the first test signal has a specific frequency, and setting the at least a calibration coefficient as at least a second eliminating value, and utilizing the transmitter to transmit a second test signal via the at least a calibration coefficient and via the first signal path and the second signal path to generate a second transmitting signal, wherein the second test signal has a specific frequency. The spectrum analyzing circuit is utilized for performing a spectrum analyzing operation on the sent back first transmitting signal to generate a first spectrum analyzing result, and performing a spectrum analyzing operation on the sent back second transmitting signal to generate a second spectrum analyzing result. The calibration coefficient calculating unit is utilized for calculating the at least a target eliminating value according to the first eliminating value, the second eliminating value, the first spectrum analyzing result, and the second spectrum analyzing result, and setting the at least a calibration coefficient as the at least a target eliminating value.

Briefly summarized, the calibration apparatus and the calibration method disclosed by the present invention are capable of compensating the mismatches of an in-phase (I) signal path and a quadrature (Q) signal path of a transmitter/receiver, and more particularly, the calibration apparatus and the calibration method disclosed by the present invention are capable of compensating the mismatches between the mixers in the I signal path and the Q signal path of the transmitter/receiver, and the mismatches between the low pass filters in the I signal path and the Q signal path of the transmitter/receiver. After the mismatches between the I signal path and the Q signal path are compensated/calibrated properly, the electronic device can have a better communication performance.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
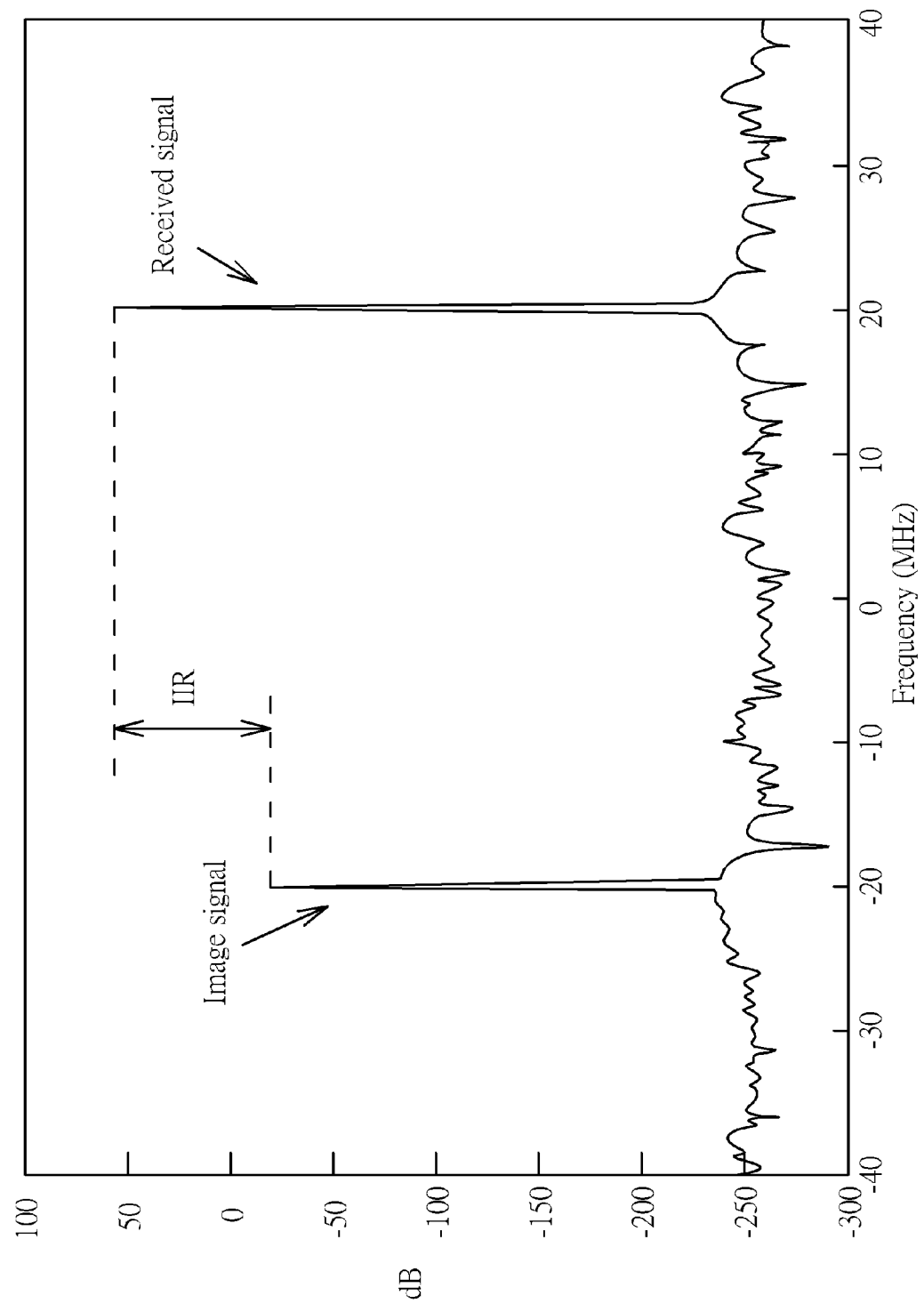
FIG. 1 is a diagram illustrating a received signal received by a receiving terminal and an undesired image signal accompanying the received signal.
Figure 2:
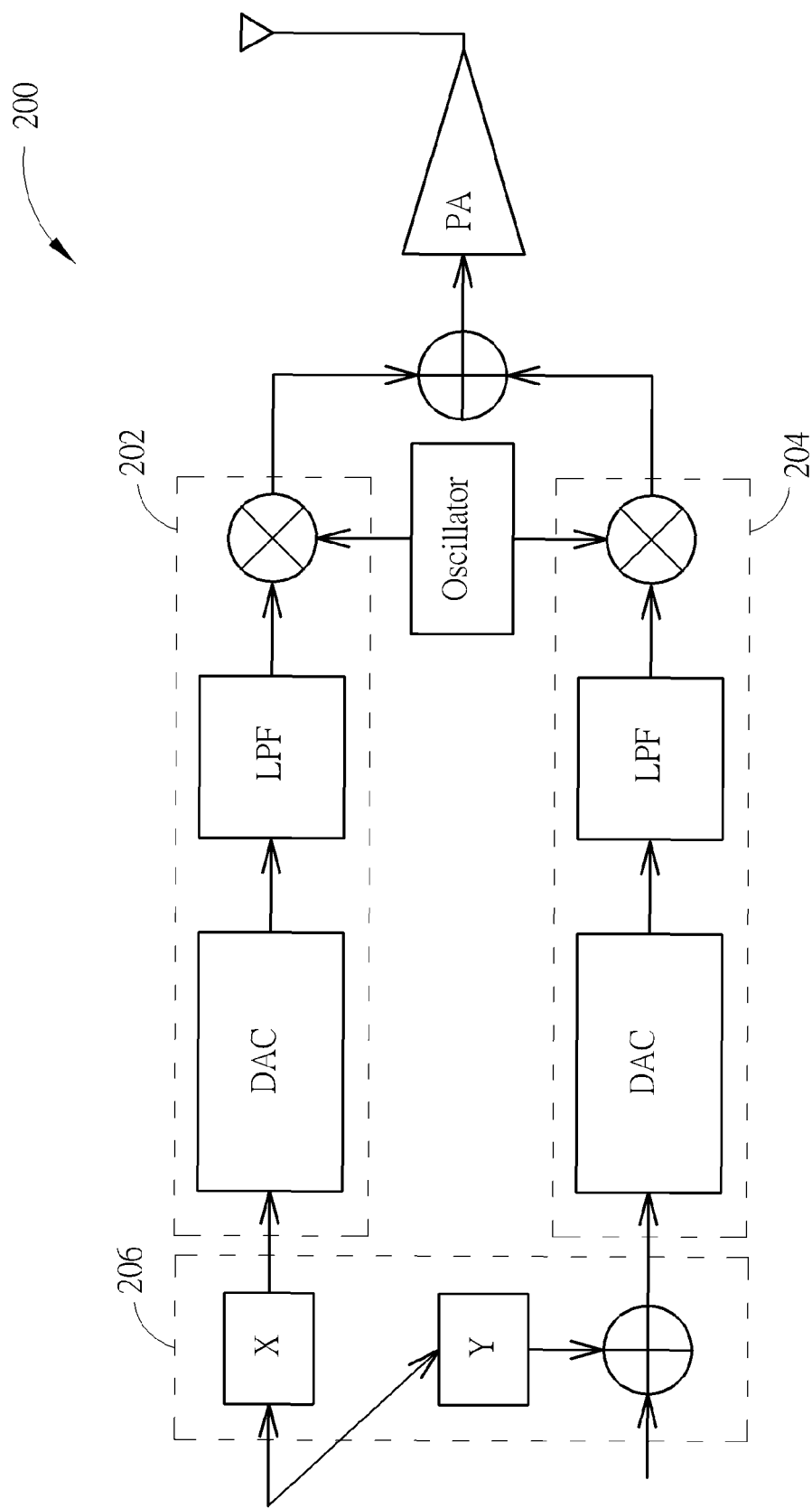
FIG. 2 is a block diagram illustrating a transmitter of a direct frequency conversion transceiver.

About the calibration apparatus the present invention, the basic theory of it will be explained in math first. Please refer to FIG. 2. FIG. 2 is a block diagram illustrating a transmitter 200 of a direct frequency conversion transceiver. In general, in order to test whether mismatches exist in an in-phase (I) signal path 202 and a quadrature (Q) signal path 204 of a transmitter 200, it is practical to input a single-tone signal to the transmitter 200 and via the transmitter 200, and then observe whether an image signal generated in the output terminal. When the generated image signal has higher level, it means a higher mismatch level between the in-phase (I) signal path 202 and the quadrature (Q) signal path 204. The transmitter 200 comprises a calibration coefficient unit 206 having two calibration coefficients that are a first calibration coefficient X and a second calibration coefficient Y, respectively. As shown in FIG. 2, the first calibration coefficient X is utilized for calibrating the amplitude mismatch level between the in-phase (I) signal path 202 and the quadrature (Q) signal path 204, and the second calibration coefficient Y is utilized for calibrating the phase mismatch level between the in-phase (I) signal path 202 and the quadrature (Q) signal path 204. It is practical to eliminate the image signal by changing the first calibration coefficient X and the second calibration coefficient Y in the calibration coefficient unit 206. In theory, if the image signal is required to be completely eliminated, the following formulas have to be satisfied:

$$X=1/R \cos(\Phi)) \quad (1)$$

$$Y=-\tan(\Phi)) \quad (2)$$

$\Phi$ represents a phase difference generated by a single frequency test signal having frequency of fs passing the mismatch level between the in-phase (I) signal path 202 and the quadrature (Q) signal path 204, and R represents a amplitude difference ratio generated by the single frequency test signal having frequency of fs passing the mismatch level between the in-phase (I) signal path 202 and the quadrature (Q) signal path 204.

Figure 3:
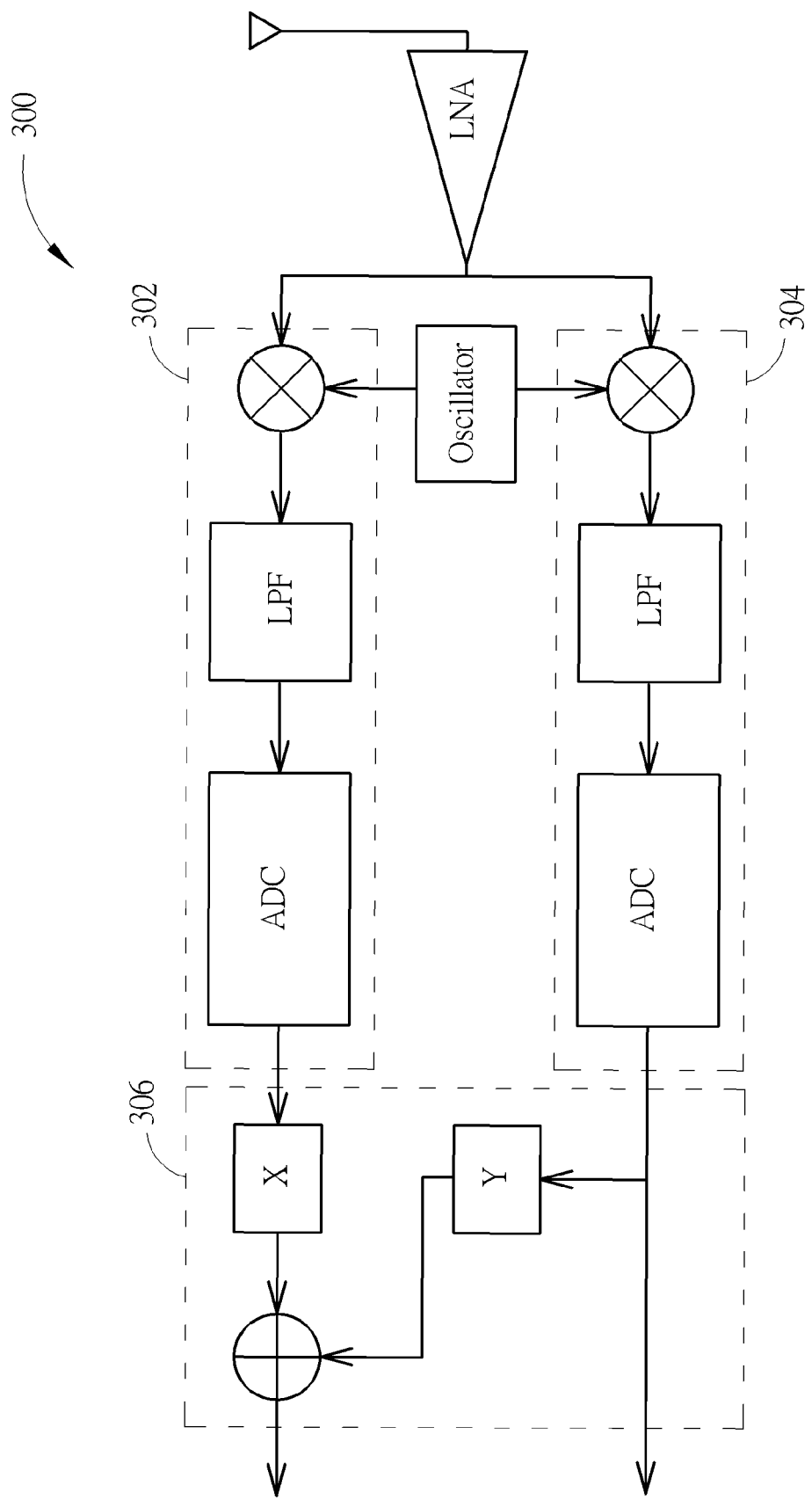
FIG. 3 is a block diagram illustrating a receiver of a direct frequency conversion transceiver.

Besides, please refer to FIG. 3. FIG. 3 is a block diagram illustrating a receiver 300 of a direct frequency conversion transceiver. In general, in order to test whether mismatches exist in an in-phase (I) signal path 302 and a quadrature (Q) signal path 304 of a receiver 300, it is practical to input a single-tone signal to the receiver 300 and via the receiver 300, and then analyze whether an image signal generated at the receiver output. When the generated image signal has higher level, it means a higher mismatch level between the in-phase (I) signal path 302 and the quadrature (Q) signal path 304. The receiver 300 comprises a calibration coefficient unit 306 having two calibration coefficients that are a first calibration coefficient X and a second calibration coefficient Y, respectively. Similarly, the image signal can be completely eliminated when $X=1/R \cos(\Phi))$ and $Y=-\tan(\Phi))$, wherein $\Phi$ represents a phase difference generated by a single frequency test signal having frequency of fs passing the mismatch level between the in-phase (I) signal path 302 and the quadrature (Q) signal path 304, and R represents a amplitude difference ratio generated by the single frequency test signal having frequency of fs passing the mismatch level between the in-phase (I) signal path 302 and the quadrature (Q) signal path 304.

Figure 4:
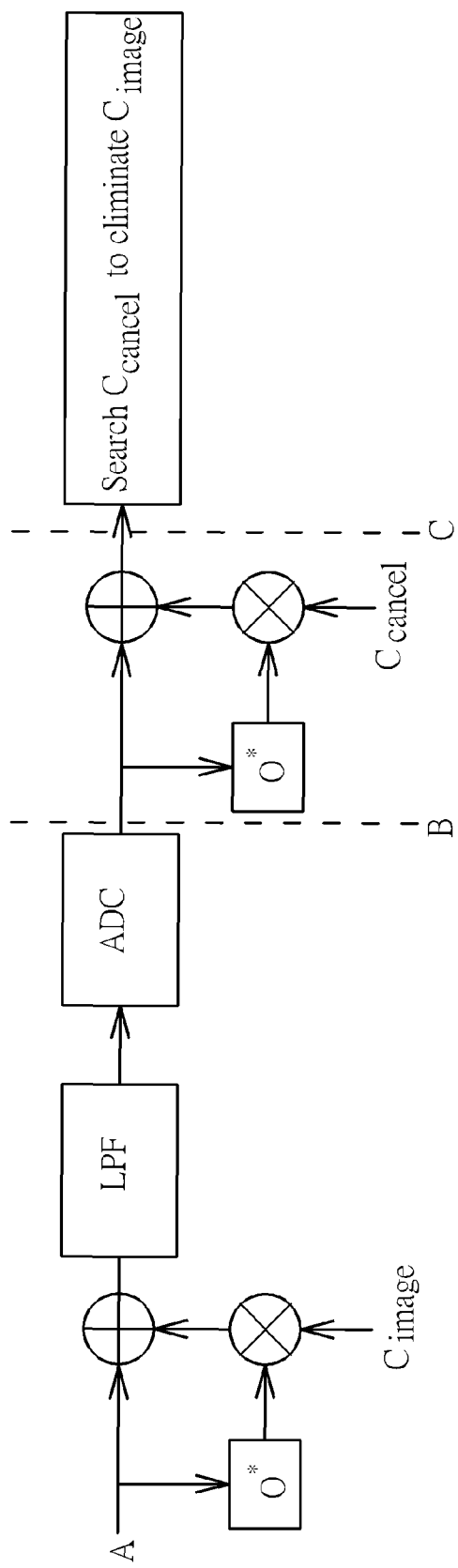
FIG. 4 is a block diagram of an equivalent baseband model of a receiver of a Direct-Conversion transceiver.

Please refer to FIG. 4. FIG. 4 is a block diagram of an equivalent baseband model of a receiver of a Direct-Conversion transceiver. As shown in FIG. 3, there are mismatches between the I signal path and the Q signal path, and thus the original signal at A point in FIG. 4 will be added with the effect of the image signal (i.e. added with the conjugated complex of the original signal at A point multiplying an image complex $C_{image}$). In this way, an image signal of the original signal is equivalently added at B point. The image signal is a noise for the receiving terminal to lower the signal receiving quality, and thus a compensation device is required to eliminate the image signal. Thus, a calibration complex $C_{cancel}$ is added to eliminate the image signal in FIG. 4. The objective of the present invention is to properly select a value of the calibration complex $C_{cancel}$ to eliminate the image signal part in the signal observed at C point. Briefly summarized, the image interference can be eliminated completely when $C_{cancel}=-C_{image}$.

Figure 5:
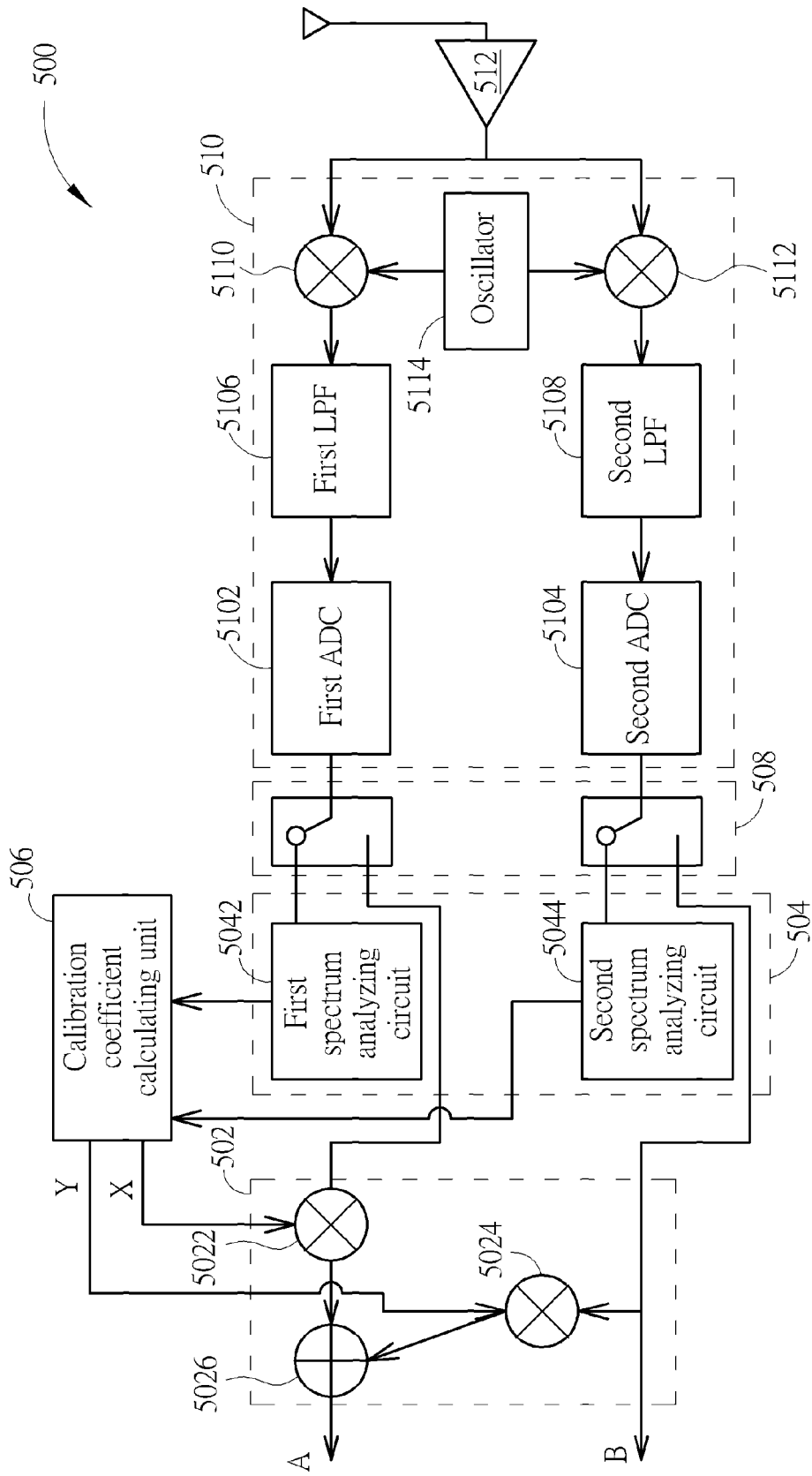
FIG. 5 is a block diagram of a calibration apparatus for calibrating mismatches of a first signal path and a second signal path of a receiver in accordance with an embodiment of the present invention.

Next, the apparatus of the present invention and related illustration will be descripted in detail in the following paragraph. Please refer to FIG. 5. FIG. 5 is a block diagram of a calibration apparatus for calibrating mismatches of a first signal path and a second signal path of a receiver 500 in accordance with an embodiment of the present invention, wherein one of the first signal path and the second signal path is an in-phase signal path (I) and the other one of the first signal path and the second signal path is a quadrature signal path (Q). The receiver 500 comprises at least a part of (such as a part of or all of) an electronic device, and the electronic device comprises at least a transmitting circuit and at least a receiving circuit. According to a variation of the present invention, the receiver 500 can represent a system comprising the electronic device, and the electronic device is a sub-system of the system, and more particularly, the electronic device can be an electronic device comprising a Direct-Conversion circuit, wherein the receiver 500 can directly calibrate the above Direct-Conversion circuit, but it is not meant to be a limitation of the present invention.

As shown in FIG. 5, the receiver 500 comprises: a calibrating unit 502, a spectrum analyzing unit 504, a calibration coefficient calculating unit 506, a switch unit 508, a first analog-to-digital converter (ADC) 5102, a second ADC 5104, a first low pass filter (LPF) 5106, a second LPF 5108, a first mixer 5110, a second mixer 5112, an oscillator 5114, and a low noise amplifier (LNA) 512. According to this embodiment, each time after the receiver 500 is restarted (such as after powered on or after the system is rebooted) and before an ordinary data receiving mode is normally started, in order to improve the circuit characteristic mismatch between an in-phase (I) signal path (i.e. a path passing by the first ADC 5102, the first LPF 5106, and the first mixer 5110 in the receiving terminal 510) and a quadrature (Q) signal path (i.e. a path passing by the second ADC 5104, the second LPF 5108, the second mixer 5112 in the receiving terminal 510) of a receiving terminal 510 (at least comprising the first ADC 5102, the second ADC 5104, the first LPF 5106, the second LPF 5108, the first mixer 5110, the second mixer 5112, and the oscillator 5114) of the receiver 500, the receiver 500 will enter into a calibration coefficient calculating mode. In other words, in the calibration coefficient calculating mode, the first step is to perform an optimal calibration coefficient calculation for the mismatch between the in-phase (I) signal path and the quadrature (Q) signal path in the receiving terminal 510 of the receiver 500, and use the calibration coefficient obtained in the calibration coefficient calculating mode to perform a normal data receiving operation. However, please note that the above embodiment is only for an illustrative purpose and is not meant to be a limitation of the present invention. In any case, various modifications and alterations of the device should fall into the disclosed scope of the present invention as long as the performances and functions disclosed by the present invention can be attained. For example, the first LPF 5106 and the second LPF 5108 also can be filters with other functions.

Specifically, the calibration point of this embodiment is to further add the calibrating unit 502 in the receiving terminal 510 of the receiver 500, wherein the calibrating unit 502 can be directly or indirectly coupled to the receiving terminal 510 of the receiver 500, and utilized for calibrating an output of the receiving terminal 510 according to a first calibration coefficient X and a second calibration coefficient Y calculated by the calibration coefficient calculating unit 506. The signal of the I signal path passing by the receiving terminal 510 will be multiplied with the first calibration coefficient X by a multiplier 5022, so as to calibrate the amplitude mismatch between the I signal path and the Q signal path caused by the element mismatch between the first signal path and the second signal path of the receiving terminal 510. The signal of the Q signal path passing by the receiving terminal 510 will be multiplied with the second calibration coefficient Y by a multiplier 5024 and added with the signal of the I signal path, after passing by the receiving terminal 510 and being multiplied with the first calibration coefficient X, by an adder 5026, so as to calibrate the phase mismatch between the I signal path and the Q signal path caused by the element mismatch between the first signal path and the second signal path of the receiving terminal 510. However, please note that the above embodiment is only for an illustrative purpose and is not meant to be a limitation of the present invention. It is also practical to use over two calibration coefficients, but the corresponding complexity and accuracy also might have variations. Or, it is practical to use the opposite way to set the first calibration coefficient X and the second calibration coefficient Y (i.e. the first calibration coefficient X is in the Q signal path, and the second calibration coefficient Y is coupled between the I signal path and the Q signal path, and the signals are added in the Q signal path). About the determining method of the optimal values of the first calibration coefficient X and the second calibration coefficient Y and related details will be descripted in detail in the following paragraph.

The prior art generally analyzes the image signal part of the received signal generated by the receiving terminal 510. For example, the prior art adjusts the values of the first calibration coefficient X and the second calibration coefficient Y according to the image signal, so as to find out the optimal values to make the image signal the smallest. In this embodiment, the present invention method performs a spectrum analyzing operation respectively for the signal part of the received signal at a signal main frequency $W_0$ in the I signal path and the signal part of the received signal at a signal main frequency $W_0$ in the Q signal path according to a first spectrum analyzing circuit 5042 and a second spectrum analyzing circuit 5044 of the spectrum analyzing unit 504 (please note that it is different from analyzing the image signal of frequency $-W_0$ in the prior art). For example, the first spectrum analyzing circuit 5042 and the second spectrum analyzing circuit 5044 can perform a Fast Fourier transform (FFT) on the signal main frequency $W_0$. The spectrum analyzing unit 504 can obtain a complex result a+bj in the I signal path, and obtain another complex result c+dj in the Q signal path. After the complex results a+bj and c+dj pass by the first calibration coefficient X and the second calibration coefficient Y, the value at A point will be (a+bj)X+(c+dj)Y, and the value at B point is still c+dj. If the mismatches are eliminated by X and Y compensation, then the values at A point and at B point should be orthogonal (i.e. the phase difference between the values is 90 degrees). That is, after the value at B point is multiplied with j, it will be equal to the values at A point. Thus, the following formulas are obtained:

$$(c+dj)j=(aX+cY)+(bX+dY)j \qquad (3)$$

After calculated, the results are (aX+cY)=−d and (bX+dY)=c. The following results are obtained by solving the formulas:

$$X = \frac{(c^2 + d^2)}{(bc - ad)} \qquad (4)$$

$$Y = \frac{-(bd + ac)}{(bc - ad)} \qquad (5)$$

Figure 6:
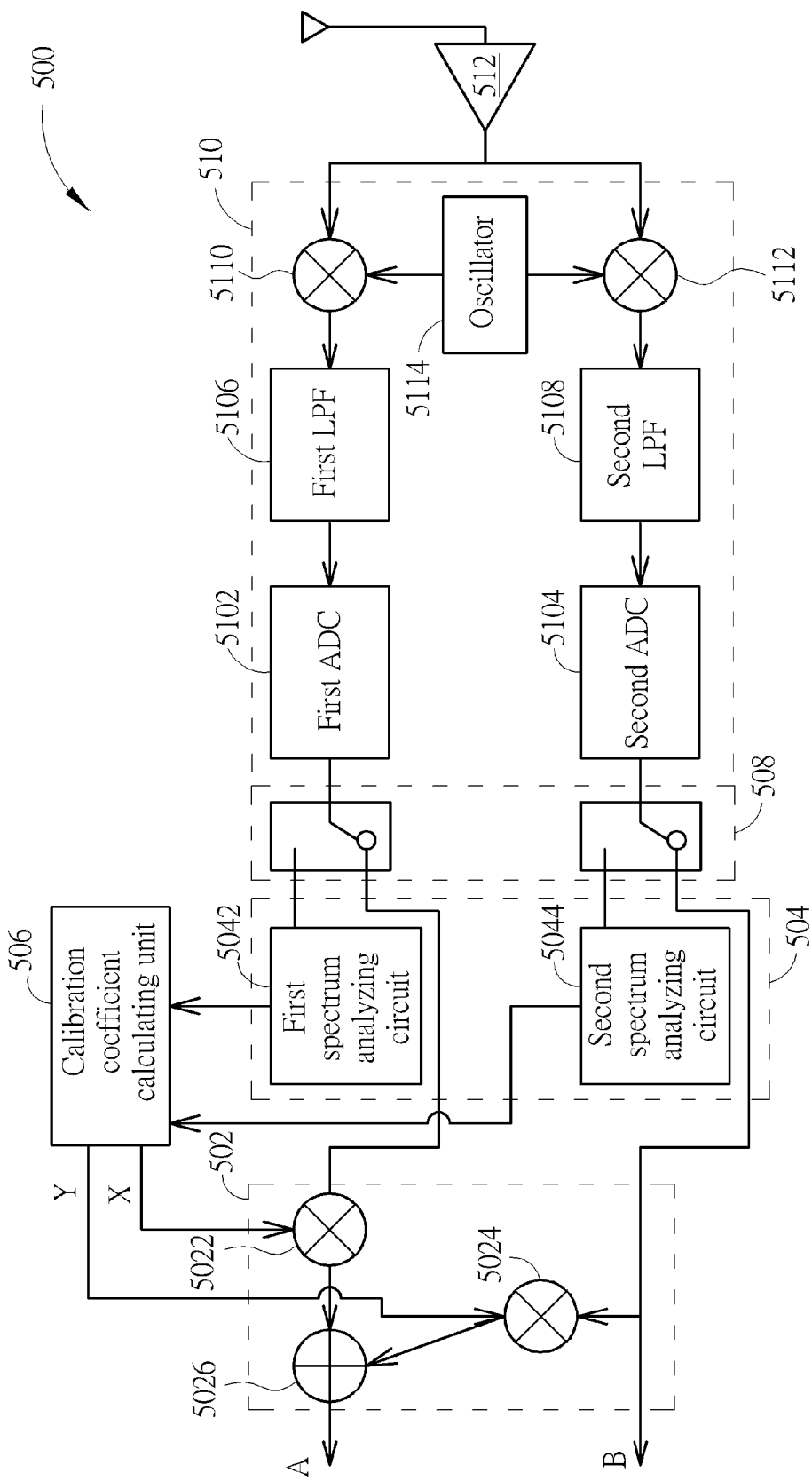
FIG. 6 is a block diagram of another setting of the calibration apparatus in FIG. 5.
Figure 7:
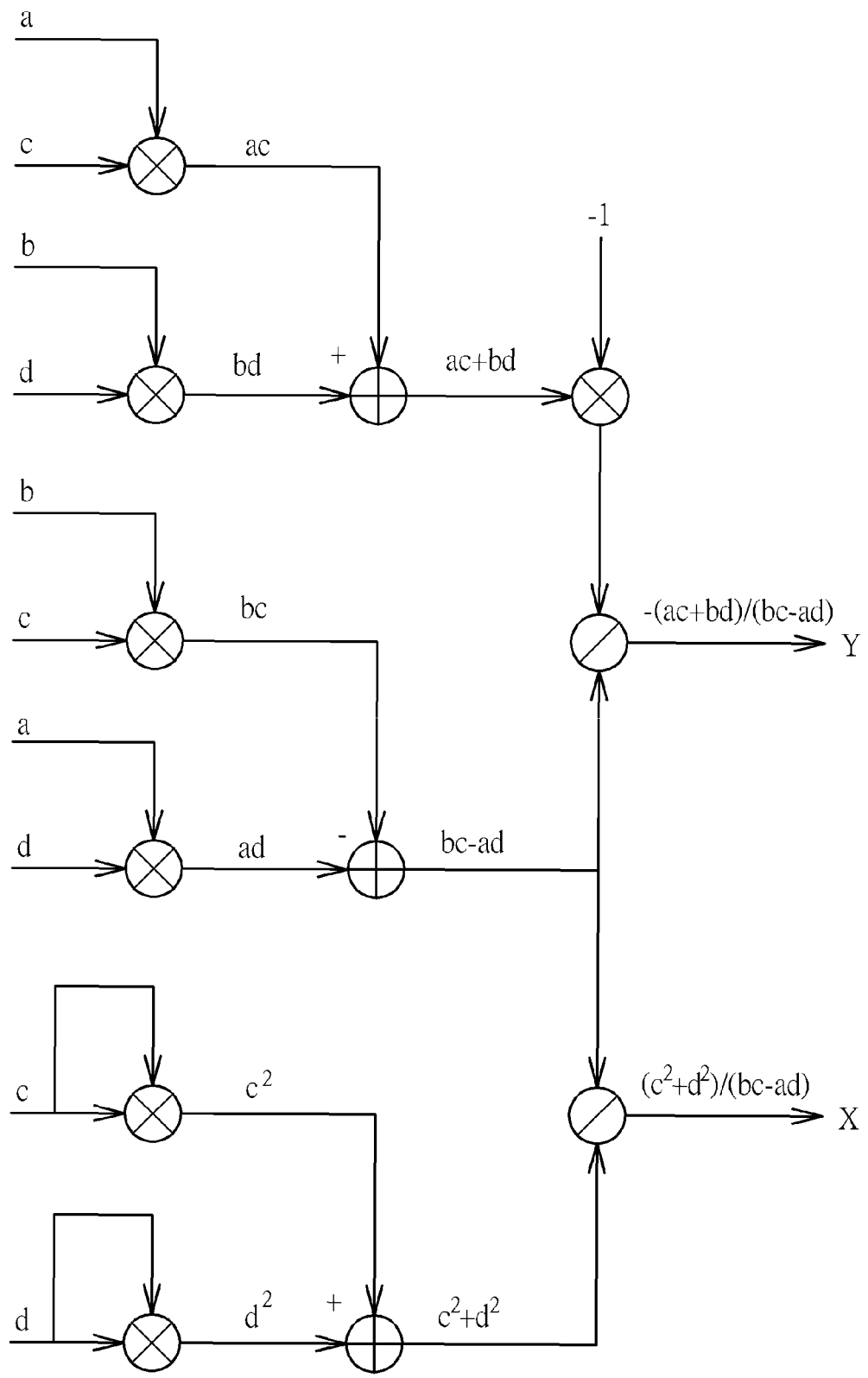
FIG. 7 is a diagram of a calibration coefficient calculating unit in accordance with an embodiment of the present invention.

FIG. 6 is a block diagram of another setting of the calibration apparatus 500 in FIG. 5. After utilizing the calibration coefficient calculating unit 506 to calculate the first calibration coefficient X and the second calibration coefficient Y, the setting of the calibration apparatus 500 can be changed from the calibration coefficient calculating mode in FIG. 5 to a normal data receiving mode in FIG. 6. FIG. 7 is a diagram of a calibration coefficient calculating unit 506 in accordance with an embodiment of the present invention, showing a circuit architecture of the calibration coefficient calculating unit 506 according to the formula (4) and the formula (5).

Figure 8:
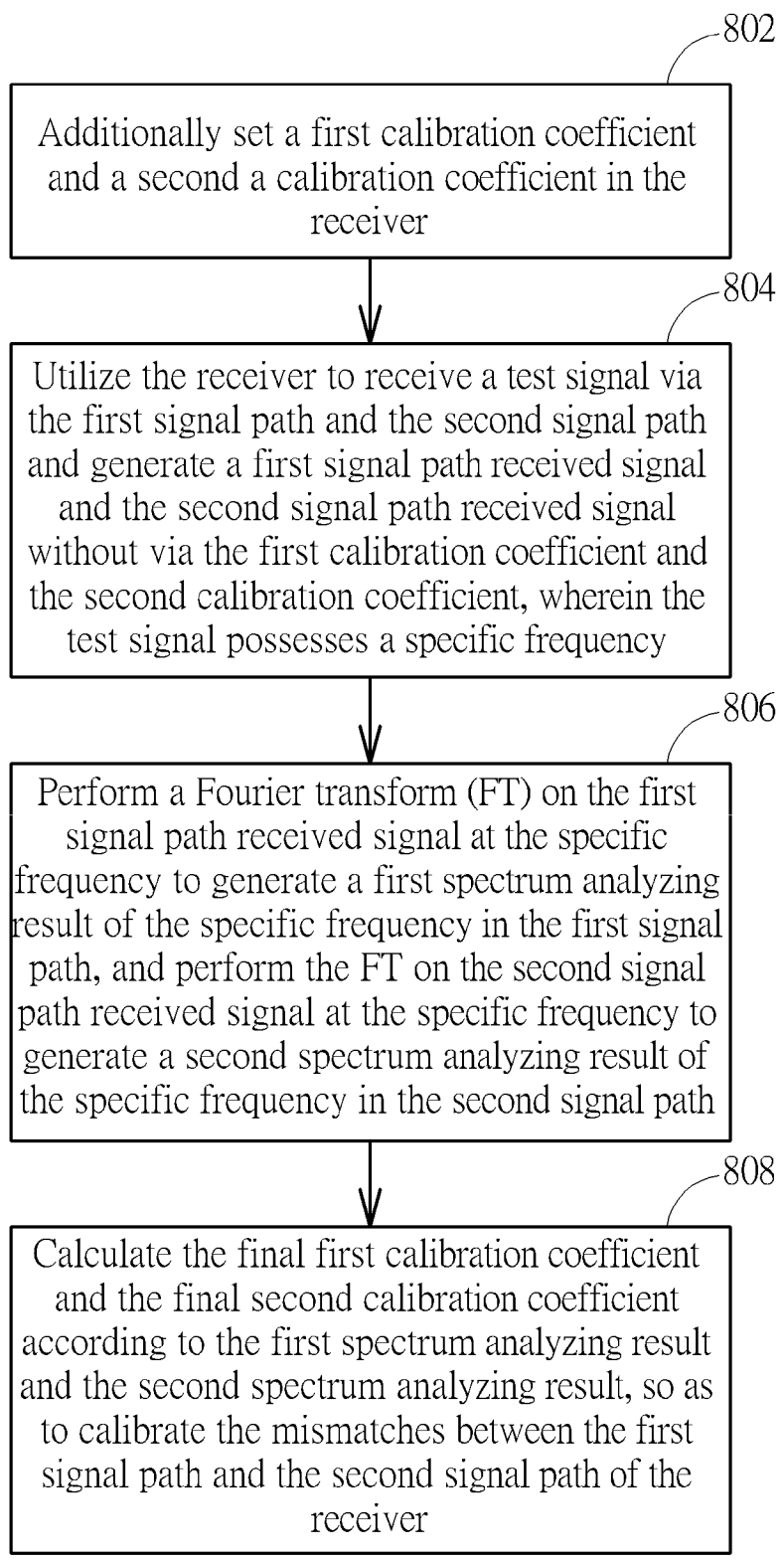
FIG. 8 shows a first exemplary flowchart of an exemplary calibration method for calibrating mismatches of a first signal path and a second signal path of a receiver.

Please refer to FIG. 8. FIG. 8 shows a first exemplary flowchart of an exemplary calibration method for calibrating mismatches of a first signal path and a second signal path of a receiver, wherein one of the first signal path and the second signal path is an in-phase signal path (I) and the other one of the first signal path and the second signal path is a quadrature signal path (Q). Provided that substantially the same result is achieved, the steps of the process flowchart do not have to be in the exact order shown in FIG. 8 and need not be contiguous, meaning that other steps can be intermediate. The calibration method in FIG. 8 can be applied to the receiver 500 in FIG. 5 and FIG. 6. The calibration method comprises the following steps:

Step 802: Additionally set a first calibration coefficient and a second a calibration coefficient in the receiver.

Step 804: Utilize the receiver to receive a test signal via the first signal path and the second signal path and generate a first signal path received signal and the second signal path received signal without via the first calibration coefficient and the second calibration coefficient, wherein the test signal possesses a specific frequency.

Step 806: Perform a Fourier transform (FT) on the first signal path received signal at the specific frequency to generate a first spectrum analyzing result of the specific frequency in the first signal path, and perform the FT on the second signal path received signal at the specific frequency to generate a second spectrum analyzing result of the specific frequency in the second signal path.

Step 808: Calculate the final first calibration coefficient and the final second calibration coefficient according to the first spectrum analyzing result and the second spectrum analyzing result, so as to calibrate the mismatches between the first signal path and the second signal path of the receiver.

After the calibration flowchart of the Step 802 to the Step 808, the optimal values of the first calibration coefficient X and the second calibration coefficient Y can be obtained directly and accurately. On the other hand, the prior art has to approximate the correct values gradually, and thus calculating the optimal values of the first calibration coefficient X and the second calibration coefficient Y by the present invention is faster than that by the prior art.

Figure 9:
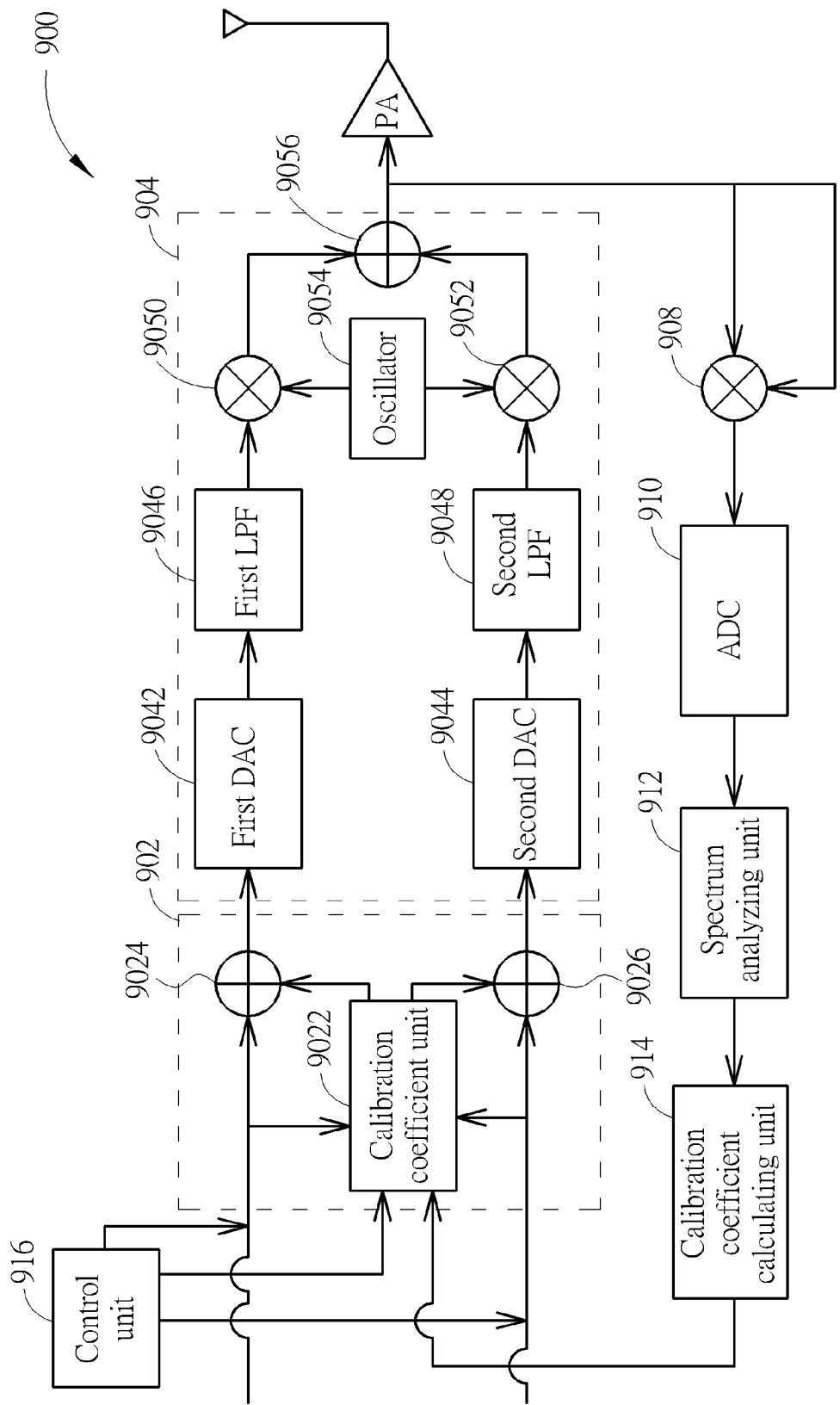
FIG. 9 is a block diagram of a calibration apparatus for calibrating mismatches of a first signal path and a second signal path of a transmitter in accordance with a first embodiment of the present invention.

Please refer to FIG. 9. FIG. 9 is a block diagram of a calibration apparatus for calibrating mismatches of a first signal path and a second signal path of a transmitter 900 in accordance with an embodiment of the present invention, wherein one of the first signal path and the second signal path is an in-phase signal path (I) and the other one of the first signal path and the second signal path is a quadrature signal path (Q). The transmitter 900 comprises at least a part of (such as a part of or all of) an electronic device, and the electronic device comprises at least a transmitting circuit and at least a transmitting circuit. According to a variation of the present invention, the transmitter 900 can represent a system comprising the electronic device, and the electronic device is a sub-system of the system, and more particularly, the electronic device can be an electronic device comprising a Direct-Conversion circuit, wherein the transmitter 900 can directly calibrate the above Direct-Conversion circuit, but it is not meant to be a limitation of the present invention.

As shown in FIG. 9, the transmitter 900 comprises: a calibrating unit 902, an adder 9056, a first digital-to-analog converter (DAC) 9042, a second DAC 9044, a first low pass filter (LPF) 9046, a second LPF 9048, a first mixer 9050, a second mixer 9052, an oscillator 9054, a power amplifier 906, a self-mixer 908, an ADC 910, a spectrum analyzing unit 912, a calibration coefficient calculating unit 914, and a control unit 916. According to this embodiment, each time after the transmitter 900 is restarted (such as after powered on or after the system is rebooted) and before an ordinary data transmitting mode is normally started, in order to improve the circuit characteristic mismatch between an in-phase (I) signal path (i.e. a path passing by the first DAC 9042, the first LPF 9046, and the first mixer 9050 in the transmitting terminal 904) and a quadrature (Q) signal path (i.e. a path passing by the second DAC 9044, the second LPF 9048, the second mixer 9052 in the transmitting terminal 904) of a transmitting terminal 904 (at least comprising the first DAC 9042, the second DAC 9044, the first LPF 9046, the second LPF 9048, the first mixer 9050, the second mixer 9052, and the oscillator 9054) of the transmitter 900, the transmitter 900 will enter into a calibration coefficient calculating mode. In other words, in the calibration coefficient calculating mode, the first step is to perform an optimal calibration coefficient calculation for the mismatch between the in-phase (I) signal path and the quadrature (Q) signal path in the transmitting terminal 904 of the transmitter 900, and use the calibration coefficient obtained in the calibration coefficient calculating mode to perform a normal data transmitting operation. However, please note that the above embodiment is only for an illustrative purpose and is not meant to be a limitation of the present invention. In any case, various modifications and alterations of the device should fall into the disclosed scope of the present invention as long as the performances and functions disclosed by the present invention can be attained. For example, the first LPF 9046 and the second LPF 9048 in the transmitter 900 also can be filters with other functions.

Specifically, the calibration point of this embodiment is to further add the calibrating unit 902, and please note that the calibrating unit 902 here is a little different from the X, Y structure of the calibrating unit 502 in FIG. 5. That is, this embodiment does not use the compensation structure of the first calibration coefficient X and the second calibration coefficient Y in the previous embodiment. The calibrating unit 902 first takes a complex conjugate of the original transmitted IQ signal, multiplies the conjugate with a calibration coefficient C to generate a image pre-compensation signal, wherein the calibration coefficient C is a complex value, and then add the pre-compensation signal back with the original transmitted IQ signal to form the calibration signal. The calibrating unit 902 using the above structure can be mathematically equivalent to the calibrating unit 502, except for a gain difference between the calibrating unit 902 and the calibrating unit 502. The calibration unit 902 can be directly or indirectly coupled to the transmitting terminal 904 of the transmitter 900 to perform the calibration. The calibration unit 902 generates a image pre-compensation signal according to the calibration coefficient C and adds the image pre-compensation signal with the original transmitted IQ signal to form calibration signal. The calibration unit 902 sends the calibration signal (the original transmitted IQ signal with its image pre-compensation signal) into the transmitter terminal 904 of the transmitter 900 and the image pre-compensation signal cancels out the image interference signal caused by the element mismatches between the first signal path and the second signal path of the transmitting terminal 904 each other. However, please note that the above embodiment is only for an illustrative purpose and is not meant to be a limitation of the present invention. The determining method and details of the optimal image signal compensating value C will be descripted in detail in the following paragraphs.

Firstly, the corresponding relation and the gain between the calibrating unit 502 in FIG. 5 and the calibrating unit 902 in FIG. 9 can be represented by the following formula:

$$X\cos(wt) + j[\sin(wt) + Y\cos(wt)] = \qquad (6)$$
$$\frac{X + jY + 1}{2}\left(e^{jwt} + \frac{X + jY - 1}{X + jY + 1}e^{-jwt}\right)$$

Figure 10:
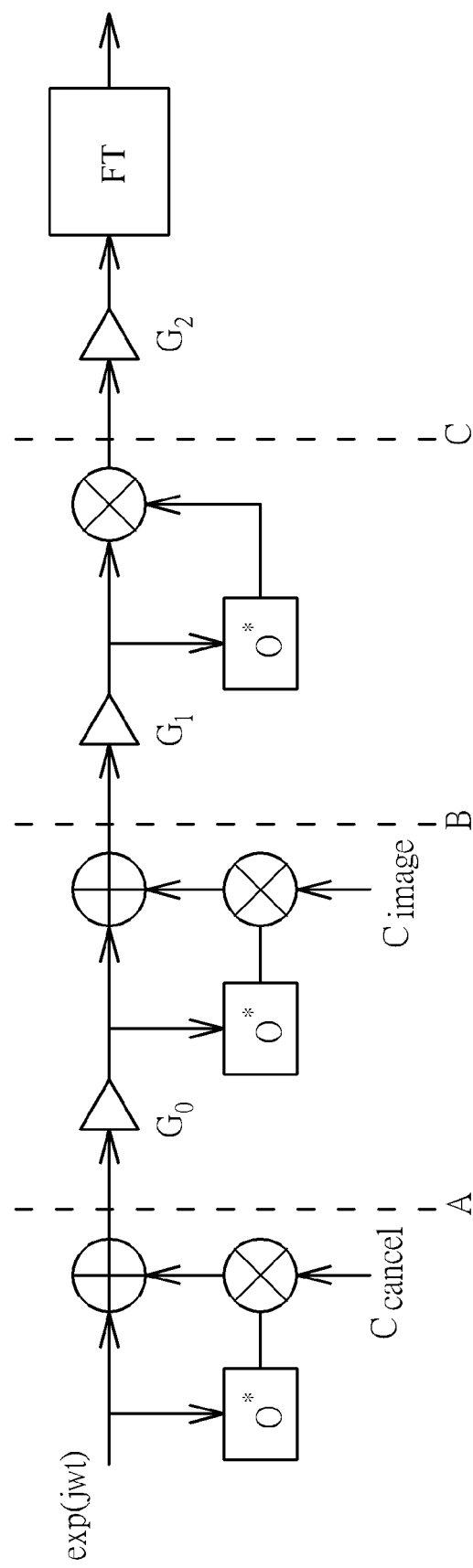
FIG. 10 is a block diagram of an equivalent baseband model of a transmitter of a Direct-Conversion transceiver.

Please refer to FIG. 10. FIG. 10 is a block diagram of an equivalent baseband model of the calibration apparatus as shown in FIG. 9. The A point in FIG. 10 represents the output of the calibration unit 902. The equivalent baseband model between A and B points of FIG. 10 models the mismatches between the I signal path and the Q signal path, and thus the signal at A point in FIG. 10 will be added with the effect of the image interference signal (i.e. added with the complex conjugate of the signal at A point multiplying an image coefficient, $C_{image}$). The image coefficient $C_{image}$ is a system parameter to represent the mismatch level of the transmitting terminal 904 of the transmitter 900. In this way, an image interference signal of the original signal has been established in this equivalent baseband model at B point. The image interference signal is a noise for the receiving terminal to lower the signal receiving quality, and thus a calibration unit is required to generate a image pre-compensation signal to eliminate the image interference signal. The calibration unit generates an image pre-compensation signal by taking a complex conjugate of the baseband transmitted IQ signal and multiplying it with a calibration coefficient $C_{cancel}$. The calibration unit then adds the image pre-compensation signal back with the baseband transmitted IQ signal to form the calibration signal. The calibration signal (the baseband IQ signal with its image pre-compensation signal) at A point is sent to the equivalent baseband mismatch model between A and B point and the image pre-compensation signal should cancel out the image interference signal at B point with only the desired baseband transmitted IQ signal left. The equivalent baseband model between B and C points of FIG. 10 gives a mathematical description of the behavior of self-mixer in the loopback path. After the self-mixer, a Fourier Transform (FT) is performed upon the signal of C point to get a frequency analysis result at a specific frequency. The objective of the present invention is to properly select a value of the calibration coefficient $C_{cancel}$ to eliminate the image signal part in the signal observed at C point. Briefly summarized, the image interference signal can be eliminated completely when $C_{cancel} = -C_{image}$. A complete mathematical analysis at A, B and C points with the input of a single frequency test signal of the frequency w is respectively represented by the following formulas. The resulting P of FT performed on the signal of the C point at the frequency −2w is also given by the formula (10).

$$A(t) = e^{jwt} + C_{cancel}e^{-jwt} \qquad (7)$$

$$B(t) = (G_0 + C_{image}G_0^*C_{cancel}^*)e^{jwt} + (G_0^* + C_{image}G_0C_{cancel}^*)e^{-jwt} \approx \qquad (8)$$
$$G_0e^{jwt} + (G_0^*C_{image} + G_0C_{cancel})e^{-jwt}$$

$$C(t) = DC + |G_1|^2(G_0C_{image}^* + G_0^*C_{cancel}^*)e^{j2wt} + \qquad (9)$$
$$|G_1|^2G_0^*(G_0^*C_{image} + G_0C_{cancel})e^{-j2wt}$$

$$P = G_2|G_1|^2G_0^*(G_0^*C_{image} + G_0C_{cancel}) = G(C'_{image} + C_{cancel}) \qquad (10)$$

$G_0$ is a gain of the first DAC 9042/the second DAC 9044, and $G_1$ is a gain of the transmitting path, and $G_2$ is a gain between the mixer 908 and the ADC 910, wherein $G_0$, $G_1$, and $G_2$ are unknown. G represents a total gain of the path from the first DAC 9042/the second DAC 9044 to the output of ADC 910, and $C'_{image}$ is an equivalent value of $C_{image}$ observed from the digital domain, and thus the formula (10) can be simplified to be:

$$P = G(C_{image} + C_{cancel}) \qquad (11)$$

Figure 11:
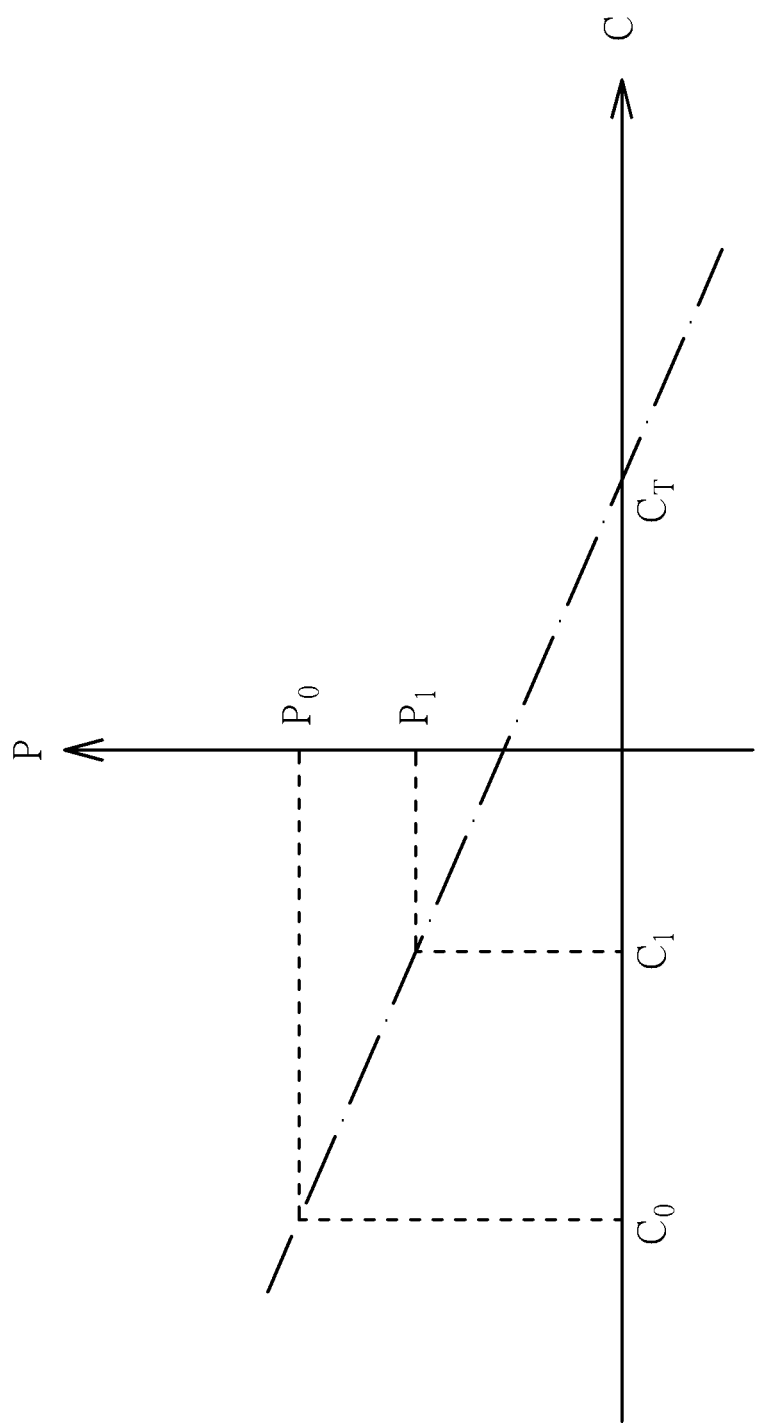
FIG. 11 is a diagram using the first eliminating value and the second eliminating value to obtain the optimal image signal compensation value.

According to the formula (11), since the image coefficient $C_{image}$ representing the mismatches between the I signal path and the Q signal path of the transmitting terminal 904 is a fixed value, the converting result P obtained by performing FT at the frequency −2w linearly depends on the calibration coefficient $C_{cancel}$. That is, the calibration coefficient $C_{cancel}$ and the converting result P are linear dependent. Thus, in this embodiment, the control unit 916 will generate a test signal and use a first eliminating value $C_0$ and a second eliminating value $C_1$ to put into the calibration coefficient unit 9022 in the calibrating unit 902, to make the compensated signal be observed in the baseband digital domain after passing by transmitting terminal 904, the self-mixer 908 and the ADC 910, and use the spectrum analyzing unit 912 to obtain a first converting result $P_0$ and a second converting result $P_1$. Since the above formula (11) is a linear formula, it is practical to use the linearity to obtain an optimal calibration coefficient $C_T$ from the first eliminating value $C_0$ and the second eliminating value $C_1$ and the respectively corresponding first converting result $P_0$ and the second converting result $P_1$, wherein a converting result $P_T$ corresponding to the optimal calibration coefficient $C_T$ is the smallest (i.e. the converting result $P_T$=0). In other words, the optimal calibration coefficient $C_T$ can be obtained by the theories of the linear extrapolation and the linear interpolation (depending on the relation between the first eliminating value $C_0$, the second eliminating value $C_1$, and the optimal calibration coefficient $C_T$). Please note that the first eliminating value $C_0$, the second eliminating value $C_1$ should be different values. FIG. 11 is a diagram illustrating how to use the linear relation of the first eliminating value and the second eliminating value to obtain the optimal calibration coefficient value. Please note that the concept of the embodiment is simplified to be two dimensional for easy understanding, and in fact it is four dimensional. The first converting result $P_0$ in FIG. 11 is $G(C_{image}+C_0)$, and the second converting result $P_1$ is $G(C_{image}+C_1)$. The optimal calibration coefficient $C_T$ is the value completely eliminating the image signal value $C_{image}$. That is, the optimal image signal compensating value $C_T = -C_{image}$. After simplified, the following formula is obtained:

$$C_T = C_0 - \frac{C_1 - C_0}{P_1 - P_0} P_0 \qquad (12)$$

Figure 12:
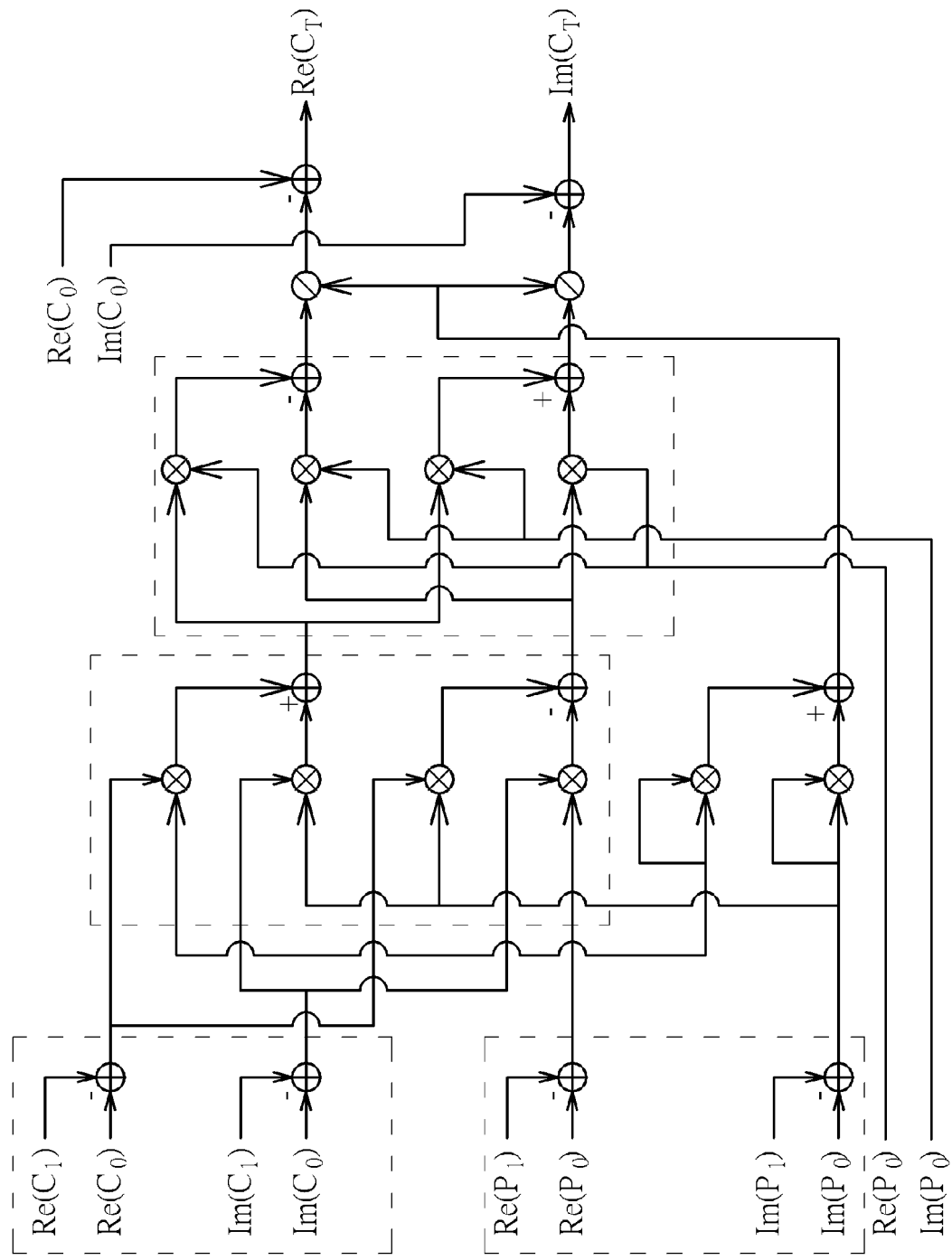
FIG. 12 is a diagram of a calibration coefficient calculating unit in accordance with another embodiment of the present invention.

FIG. 12 is a diagram of an exemplary circuit of a calibration coefficient calculating unit in accordance with an embodiment of the present invention, showing the circuit architecture details of the calibration coefficient calculating unit 914 according to the formula (12).

Figure 13:
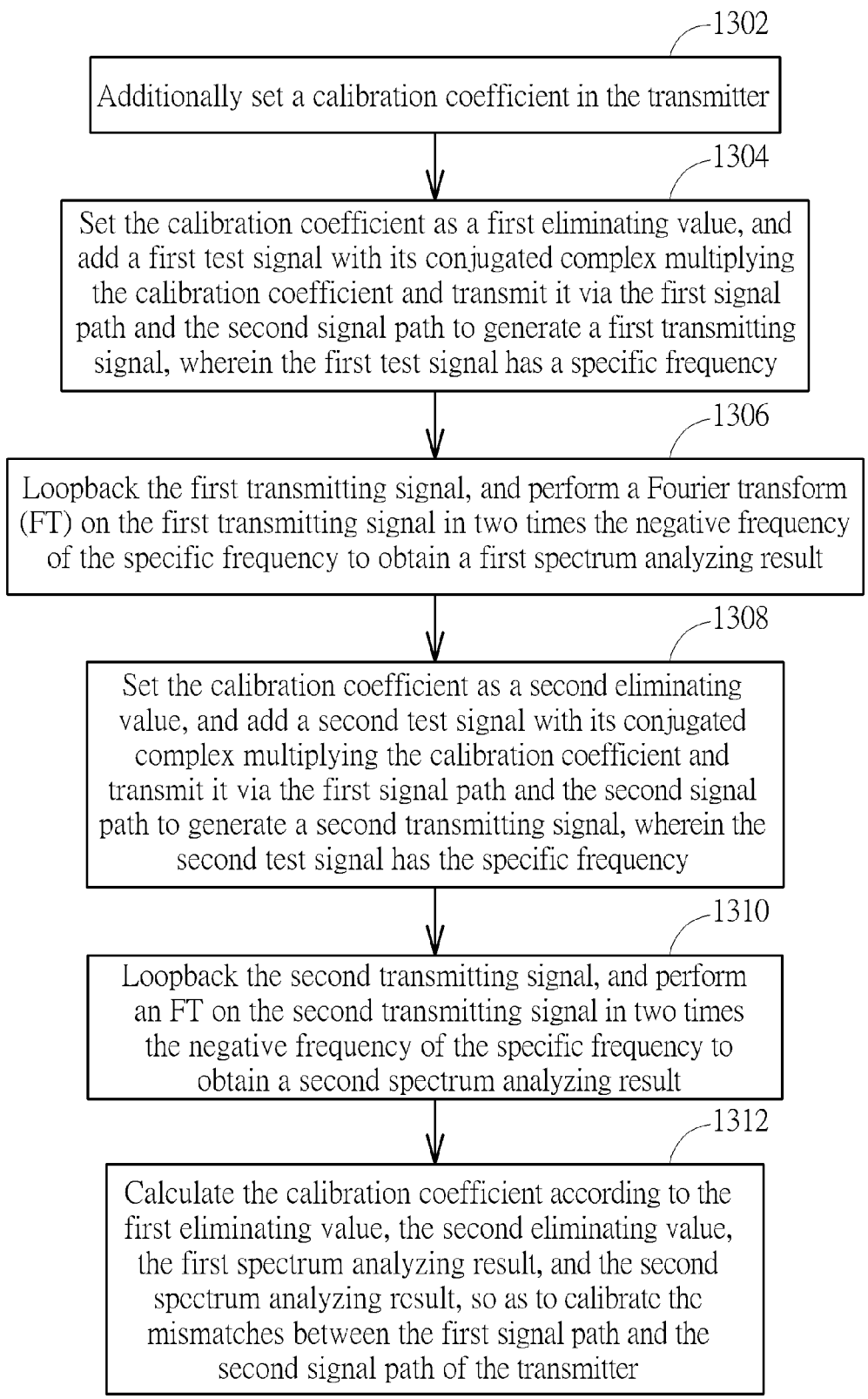
FIG. 13 shows an exemplary flowchart of an exemplary calibration method for calibrating mismatches of a first signal path and a second signal path of a transmitter.

Please refer to FIG. 13. FIG. 13 shows an exemplary flowchart of an exemplary calibration method for calibrating mismatches of a first signal path and a second signal path of a transmitter, wherein one of the first signal path and the second signal path is an in-phase signal path (I) and the other one of the first signal path and the second signal path is a quadrature signal path (Q). Provided that substantially the same result is achieved, the steps of the process flowchart do not have to be in the exact order shown in FIG. 13 and need not be contiguous, meaning that other steps can be intermediate. The calibration method in FIG. 13 can be applied to the transmitter 900 in FIG. 9. The calibration method comprises the following steps:

Step 1302: Additionally set a calibration coefficient in the transmitter.

Step 1304: Set the calibration coefficient as a first eliminating value, and add a first test signal with its conjugated complex multiplying the calibration coefficient and transmit it via the first signal path and the second signal path to generate a first transmitting signal, wherein the first test signal has a specific frequency.

Step 1306: Loopback the first transmitting signal, and perform a Fourier transform (FT) on the first transmitting signal in two times the negative frequency of the specific frequency to obtain a first spectrum analyzing result.

Step 1308: Set the calibration coefficient as a second eliminating value, and add a second test signal with its conjugated complex multiplying the calibration coefficient and transmit it via the first signal path and the second signal path to generate a second transmitting signal, wherein the second test signal has the specific frequency.

Step 1310: Loopback the second transmitting signal, and perform an FT on the second transmitting signal in two times the negative frequency of the specific frequency to obtain a second spectrum analyzing result.

Step 1312: Calculate the calibration coefficient according to the first eliminating value, the second eliminating value, the first spectrum analyzing result, and the second spectrum analyzing result, so as to calibrate the mismatches between the first signal path and the second signal path of the transmitter.

After the calibration flowchart of the Step 1302 to the Step 1312, the optimal values of the calibration coefficient $C_{cancel}$ can be obtained directly and accurately. On the other hand, the prior art has to approximate the correct values gradually, and thus the present invention is faster than that by the prior art. Besides, the present invention minimizes the corresponding image signals at the specific frequency, and thus all the image signals of the transmitting terminal 904 in the specific frequency range can be minimized. In other words, the compensation in this embodiment is performed for any appointed frequency.

Figure 14:
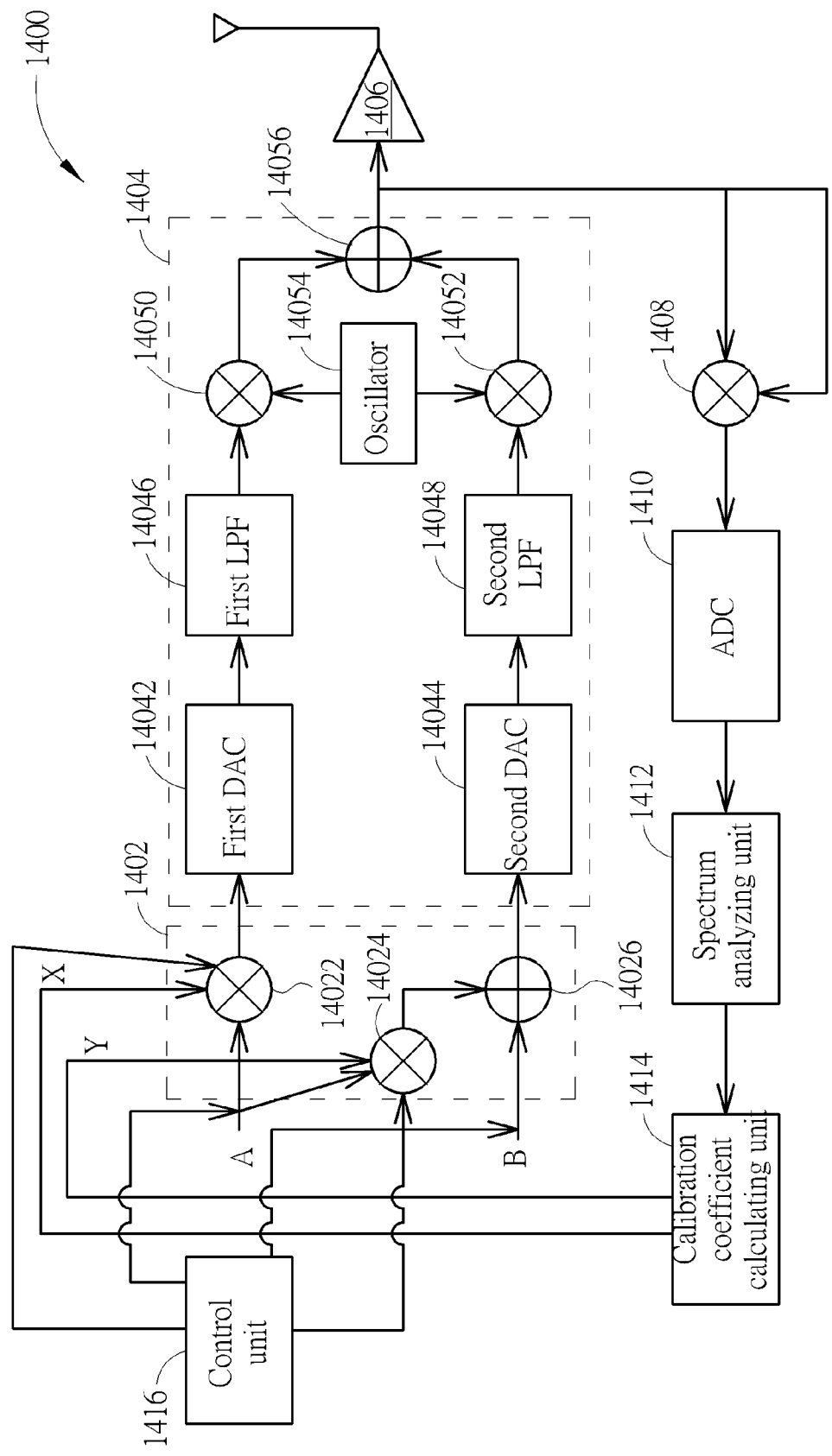
FIG. 14 is a block diagram of a calibration apparatus for calibrating mismatches of a first signal path and a second signal path of a transmitter in accordance with a second embodiment of the present invention.

Please refer to FIG. 14. FIG. 14 is a block diagram of a calibration apparatus for calibrating mismatches of a first signal path and a second signal path of a transmitter 1400 in accordance with an embodiment of the present invention, wherein one of the first signal path and the second signal path is an in-phase signal path (I) and the other one of the first signal path and the second signal path is a quadrature signal path (Q). The transmitter 1400 comprises at least a part of (such as a part of or all of) an electronic device, and the electronic device comprises at least a transmitting circuit and at least a transmitting circuit. According to a variation of the present invention, the transmitter 1400 can represent a system comprising the electronic device, and the electronic device is a sub-system of the system, and more particularly, the electronic device can be an electronic device comprising a Direct-Conversion circuit, wherein the transmitter 1400 can directly calibrate the above Direct-Conversion circuit, but it is not meant to be a limitation of the present invention.

As shown in FIG. 14, the transmitter 1400 comprises: a calibrating unit 1402, an adder 14056, a first digital-to-analog converter (DAC) 14042, a second DAC 14044, a first low pass filter (LPF) 14046, a second LPF 14048, a first mixer 14050, a second mixer 14052, an oscillator 14054, a power amplifier 1406, a self-mixer 1408, an ADC 1410, a spectrum analyzing unit 1412, a calibration coefficient calculating unit 1414, and a control unit 1416. According to this embodiment, each time after the transmitter 1400 is restarted (such as after powered on or after the system is rebooted) and before an ordinary data transmitting mode is normally started, in order to improve the circuit characteristic mismatch between an in-phase (I) signal path (i.e. a path passing by the first DAC 14042, the first LPF 14046, and the first mixer 14050 in the transmitting terminal 1404) and a quadrature (Q) signal path (i.e. a path passing by the second DAC 14044, the second LPF 14048, the second mixer 14052 in the transmitting terminal 1404) of a transmitting terminal 1404 (at least comprising the first DAC 14042, the second DAC 14044, the first LPF 14046, the second LPF 14048, the first mixer 14050, the second mixer 14052, and the oscillator 14054) of the transmitter 1400, the transmitter 1400 will enter into a calibration coefficient calculating mode. In other words, in the calibration coefficient calculating mode, the first step is to perform an optimal calibration coefficient calculation for the mismatch between the in-phase (I) signal path and the quadrature (Q) signal path in the transmitting terminal 1404 of the transmitter 1400, and use the calibration coefficient obtained in the calibration coefficient calculating mode to perform a normal data transmitting operation. However, please note that the above embodiment is only for an illustrative purpose and is not meant to be a limitation of the present invention. In any case, various modifications and alterations of the device should fall into the disclosed scope of the present invention as long as the performances and functions disclosed by the present invention can be attained. For example, the first LPF 14046 and the second LPF 14048 in the transmitter 1400 also can be filters with other functions.

Specifically, the calibration point of this embodiment is to further add the calibrating unit 1402, wherein the calibrating unit 1402 comprise a multiplier 14022, 14024, and an adder 14026, and please note that the calibrating unit 1402 here is the same X, Y structure as that of the calibrating unit 502 in FIG. 5. According to the formula (6), the method in FIG. 13 can be changed a little and applied to the X, Y structure shown in FIG. 2. The calibration unit 1402 can be directly or indirectly coupled to the transmitting terminal 1404 of the transmitter 1400 to perform the calibration for an input of the transmitting terminal 1404 according to a first calibration coefficient X and a second calibration coefficient Y calculated by the calibrating coefficient calculating unit 1414. The operation details are the same as the previous embodiment, and thus further explanation of the details and operations are omitted herein for the sake of brevity. Specifically, in this embodiment, the control unit 1416 will generate a control signal firstly, and respectively select two groups of the first calibration coefficient X and the second calibration coefficient Y (i.e. $(X_0, Y_0)$ and $(X_1, Y_1)$) and bring into the calibration unit 1402, and obtain the optimal values $(X_T, Y_T)$ of the first calibration coefficient X and the second calibration coefficient Y by using the theory similar to that of the previous embodiment. In order to bring in the result of the previous embodiment (i.e. the formula (12)), the first calibration coefficient X and the second calibration coefficient Y have to be converted to the calibration coefficients $C_{XY0}$ and $C_{XY1}$ in complex form.

$$C_{XY} = \frac{X + jY - 1}{X + jY + 1} \quad (13)$$

Since the converting process will generate gain variation, it has to further calculate two groups of the first calibration coefficient X and the second calibration coefficient Y (i.e. $(X_0, Y_0)$ and $(X_1, Y_1)$), and corresponding gain values $g_0$ and $g_1$ for converting to $C_{XY0}$ and $C_{XY1}$, respectively.

$$g = \frac{1}{\left|\frac{X + jY + 1}{2}\right|^2} \quad (14)$$

The formula (12) is changed to the formula (15) finally.

$$C_{XYT} = C_{XY0} - \frac{C_{XY1} - C_{XY0}}{g_1 P_1 - g_0 P_0} g_0 P_0 \quad (15)$$

$P_0$ and $P_1$ are a first converting result and a second converting result obtained by the spectrum analyzing 1412 for $(X_0, Y_0)$ and $(X_1, Y_1)$. Finally, the optimal first calibration coefficient X and the optimal second calibration coefficient Y (i.e. $(X_T, Y_T)$) can be obtained according to the formula (13):

$$X_T + jY_T = \frac{1 + C_{XYT}}{1 - C_{XYT}} = \frac{1 - \mathrm{Re}(C_{XYT})^2 - \mathrm{Im}(C_{XYT})^2 + j2\mathrm{Im}(C_{XYT})}{1 + \mathrm{Re}(C_{XYT})^2 + \mathrm{Im}(C_{XYT})^2 - 2\mathrm{Re}(C_{XYT})} \quad (16)$$

The formulas (15) and (16) can be combined to a formula (17)

$$X_T + jY_T = 1 + 2\frac{C_{XY0}(g_1 P_1 - g_0 P_0) - (C_{XY1} - C_{XY0})g_0 P_0}{g_1 P_1 - g_0 P_0 - C_{xy0(g_1 P_1 - g_0 P_0) + (C_{XY1} - C_{XY0})g_0 P_0}} \quad (17)$$

Figure 15:
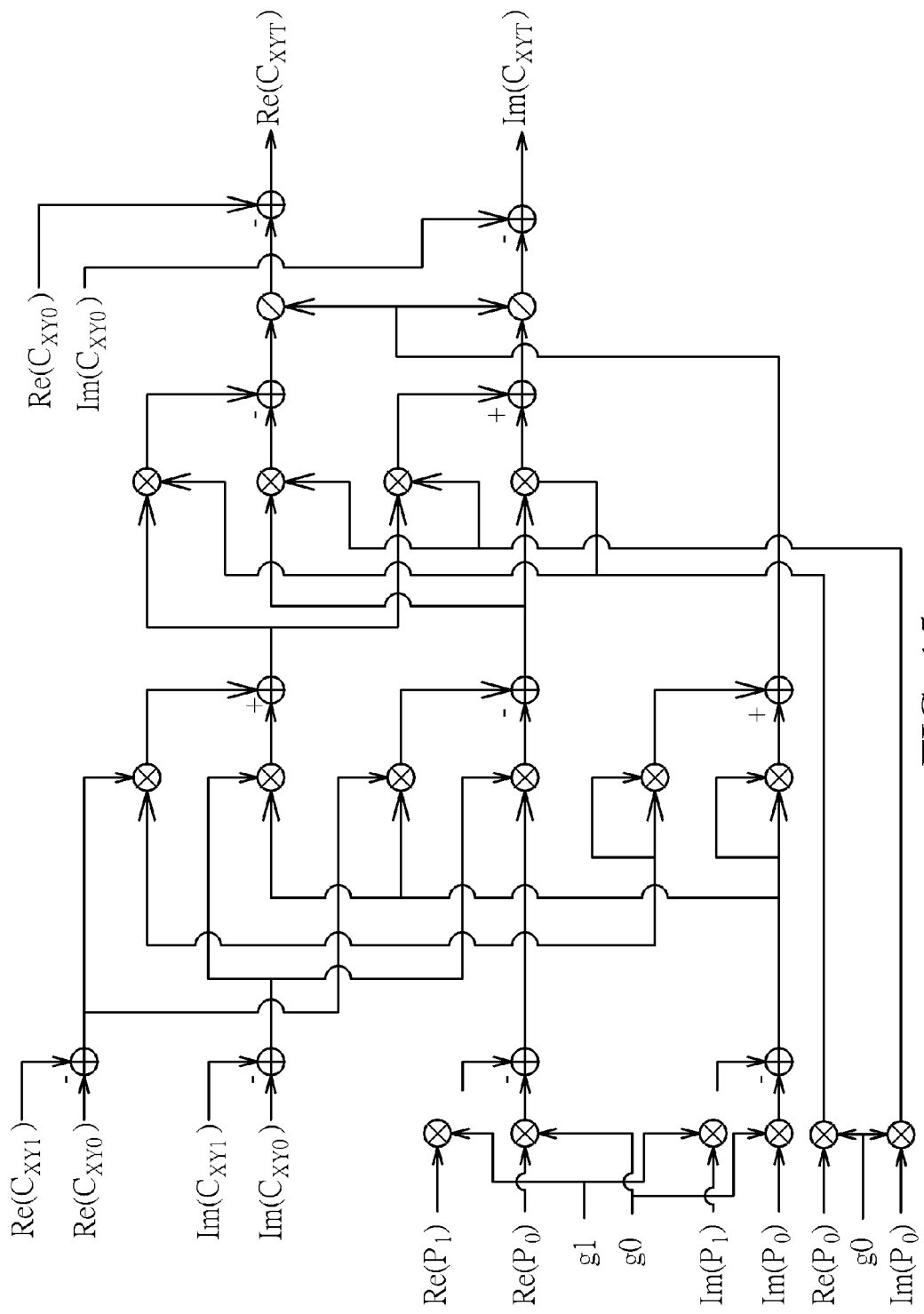
FIG. 15 is a diagram of a calibration coefficient calculating unit in accordance with another embodiment of the present invention.
Figure 16:
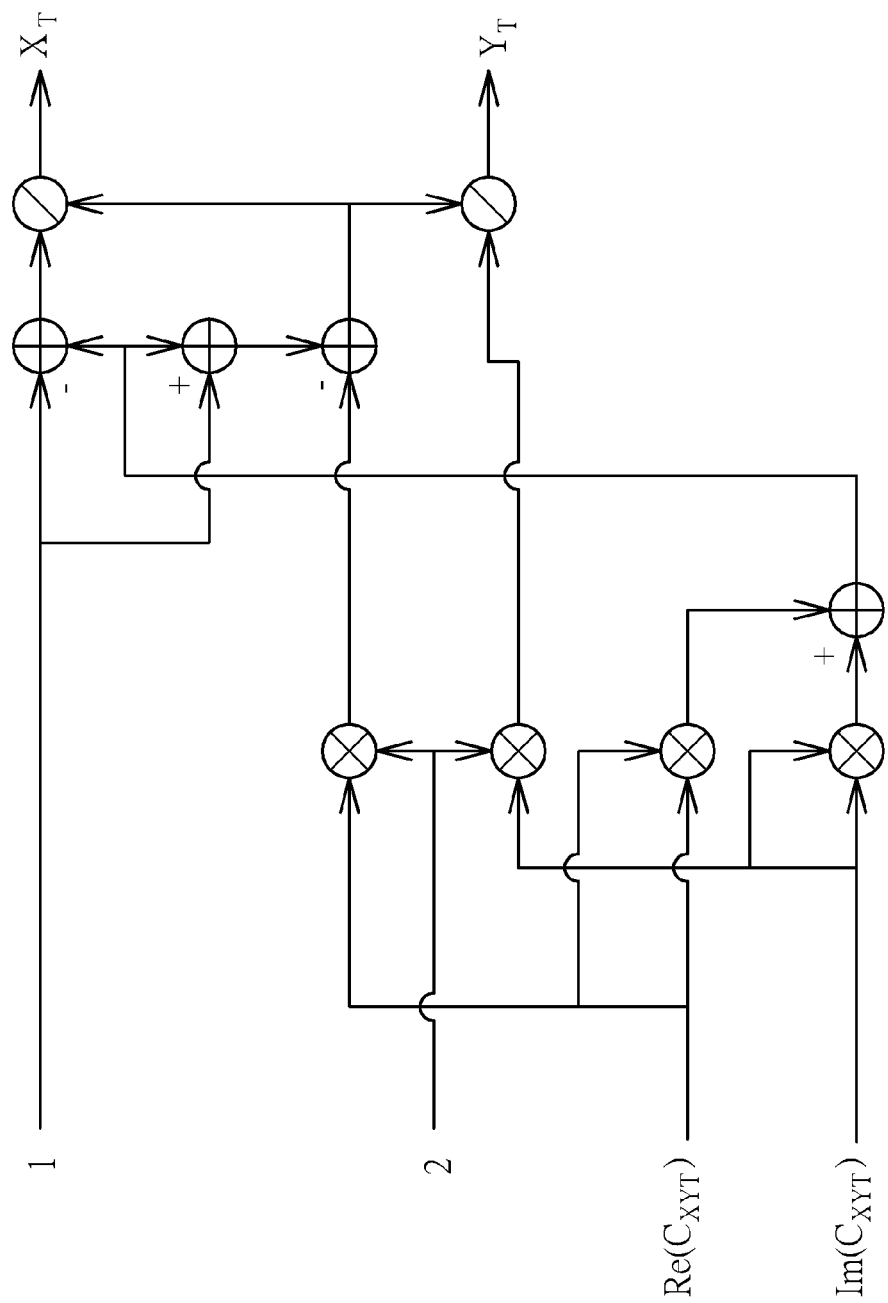
FIG. 16 is a diagram of a calibration coefficient calculating unit in accordance with another embodiment of the present invention.

The calibration coefficient calculating unit 1414 in FIG. 14 realizes the functions of the formula (15), (16), or (17). The calibration coefficient calculating unit 1414 calculates $C_{XY0}$, $C_{XY1}$, $g_0$, and $g_1$ according to $(X_0, Y_0)$ and $(X_1, Y_1)$, and utilizes $P_0$ and $P_1$ calculated by the spectrum analyzing unit 1412 to generate the optimal values $(X_T, Y_T)$. FIG. 15 is a diagram of another exemplary circuit of a calibration coefficient calculating unit in accordance with an embodiment of the present invention, showing the circuit architecture details of the calibration coefficient calculating unit 1414 according to the formula (15). FIG. 16 is a diagram of another exemplary circuit of a calibration coefficient calculating unit in accordance with an embodiment of the present invention, showing the circuit architecture details of the calibration coefficient calculating unit 1414 according to the formula (16).

Figure 17:
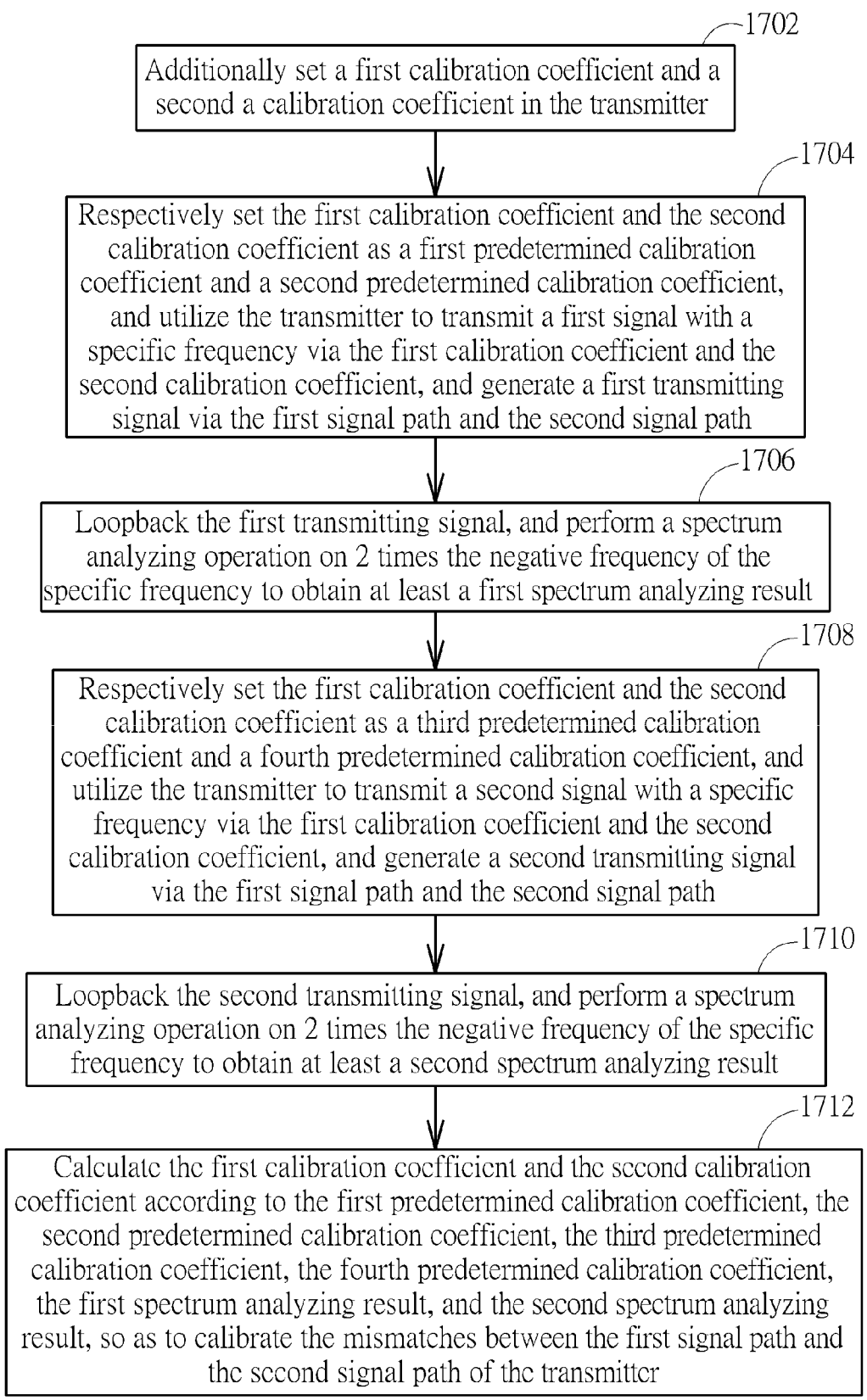
FIG. 17 shows another exemplary flowchart of an exemplary calibration method for calibrating mismatches of a first signal path and a second signal path of a transmitter.

Please refer to FIG. 17. FIG. 17 shows an exemplary flowchart of an exemplary calibration method for calibrating mismatches of a first signal path and a second signal path of a transmitter, wherein one of the first signal path and the second signal path is an in-phase signal path (I) and the other one of the first signal path and the second signal path is a quadrature signal path (Q). Provided that substantially the same result is achieved, the steps of the process flowchart do not have to be in the exact order shown in FIG. 17 and need not be contiguous, meaning that other steps can be intermediate. The calibration method in FIG. 17 can be applied to the transmitter 1400 in FIG. 14. The calibration method comprises the following steps:

Step 1702: Additionally set a first calibration coefficient and a second a calibration coefficient in the transmitter.

Step 1704: Respectively set the first calibration coefficient and the second calibration coefficient as a first predetermined calibration coefficient and a second predetermined calibration coefficient, and utilize the transmitter to transmit a first signal with a specific frequency via the first calibration coefficient and the second calibration coefficient, and generate a first transmitting signal via the first signal path and the second signal path.

Step 1706: Loopback the first transmitting signal, and perform a spectrum analyzing operation on 2 times the negative frequency of the specific frequency to obtain at least a first spectrum analyzing result.

Step 1708: Respectively set the first calibration coefficient and the second calibration coefficient as a third predetermined calibration coefficient and a fourth predetermined calibration coefficient, and utilize the transmitter to transmit a second signal with a specific frequency via the first calibration coefficient and the second calibration coefficient, and generate a second transmitting signal via the first signal path and the second signal path.

Step 1710: Loopback the second transmitting signal, and perform a spectrum analyzing operation on 2 times the negative frequency of the specific frequency to obtain at least a second spectrum analyzing result.

Step 1712: Calculate the first calibration coefficient and the second calibration coefficient according to the first predetermined calibration coefficient, the second predetermined calibration coefficient, the third predetermined calibration coefficient, the fourth predetermined calibration coefficient, the first spectrum analyzing result, and the second spectrum analyzing result, so as to calibrate the mismatches between the first signal path and the second signal path of the transmitter.

After the calibration flowchart of the Step 1702 to the Step 1712, the optimal values of the first calibration coefficient X and the second calibration coefficient Y can be obtained directly and accurately. On the other hand, the prior art has to approximate the correct values gradually, and thus calculating the optimal values of the first calibration coefficient X and the second calibration coefficient Y by the present invention is faster than that by the prior art. Besides, the present invention minimizes the corresponding image signals at the specific frequency, and thus all the image signals of the transmitting terminal 1404 in the specific frequency range can be minimized. In other words, the compensation in this embodiment is performed for any appointed frequency.

Figure 18:
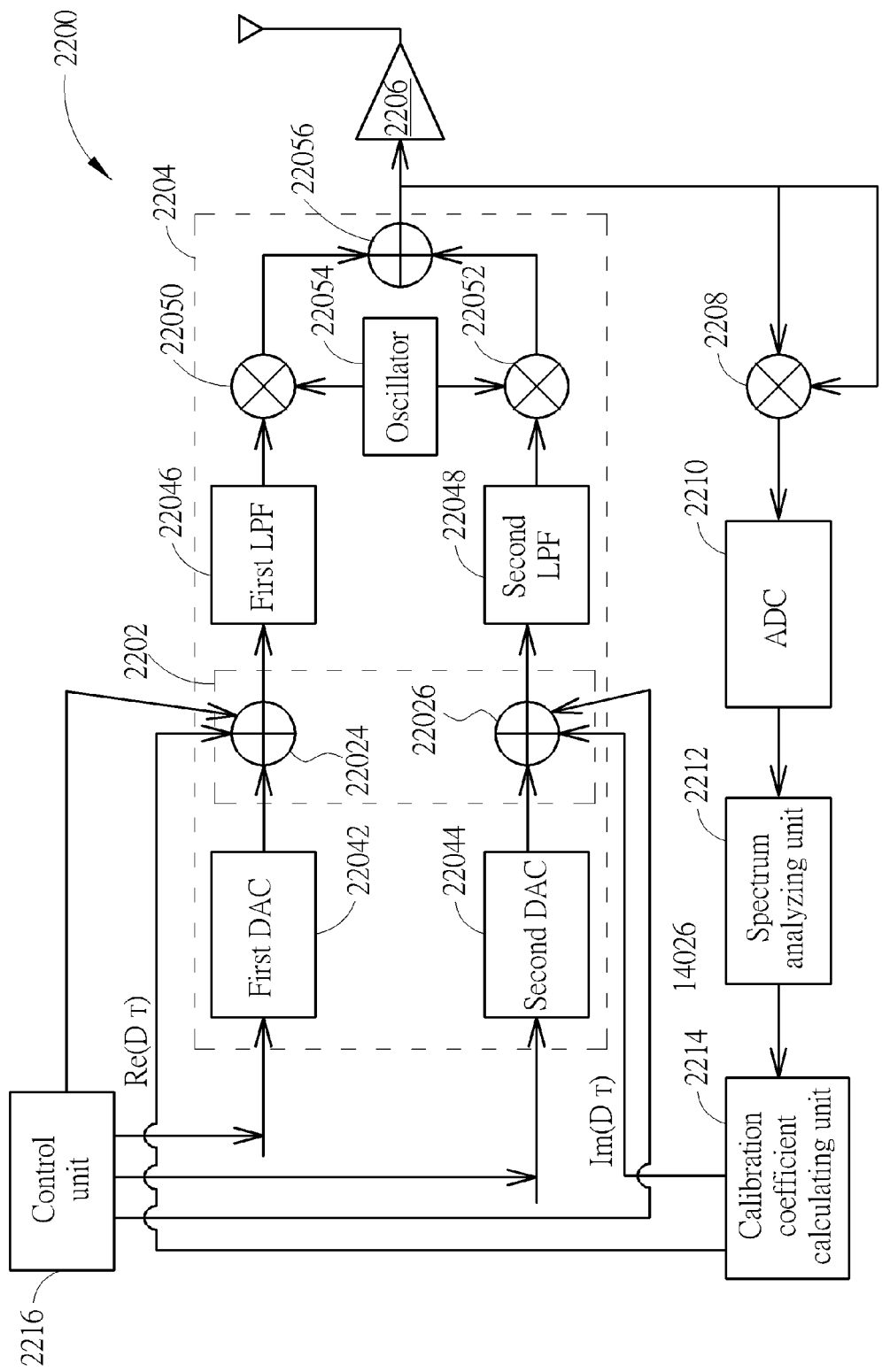
FIG. 18 is a block diagram of a calibration apparatus for calibrating leakage of an oscillator of a transmitter in accordance with an embodiment of the present invention

Please refer to FIG. 18. FIG. 18 is a block diagram of a calibration apparatus for calibrating leakage of an oscillator of a transmitter 2200 in accordance with an embodiment of the present invention, wherein one of the first signal path and the second signal path is an in-phase signal path (I) and the other one of the first signal path and the second signal path is a quadrature signal path (Q). The transmitter 2200 comprises at least a part of (such as a part of or all of) an electronic device, and the electronic device comprises at least a transmitting circuit and at least a transmitting circuit. According to a variation of the present invention, the transmitter 2200 can represent a system comprising the electronic device, and the electronic device is a sub-system of the system, and more particularly, the electronic device can be an electronic device comprising a Direct-Conversion circuit, wherein the transmitter 2200 can directly calibrate the above Direct-Conversion circuit, but it is not meant to be a limitation of the present invention.

As shown in FIG. 18, the transmitter 2200 comprises: a calibrating unit 2202, an adder 22056, a first digital-to-analog converter (DAC) 22042, a second DAC 22044, a first low pass filter (LPF) 22046, a second LPF 22048, a first mixer 22050, a second mixer 22052, an oscillator 22054, a power amplifier 2206, a self-mixer 2208, an ADC 2210, a spectrum analyzing unit 2212, a calibration coefficient calculating unit 2214, and a control unit 2216. According to this embodiment, each time after the transmitter 2200 is restarted (such as after powered on or after the system is rebooted) and before an ordinary data transmitting mode is normally started, in order to improve the LO signal leakage in a transmitting terminal 2204 (at least comprising the first DAC 22042, the second DAC 22044, the first LPF 22046, the second LPF 22048, the first mixer 22050, the second mixer 22052, and the oscillator 22054) of the transmitter 2200, the transmitter 2200 will enter into a calibration coefficient calculating mode. In other words, in the calibration coefficient calculating mode, the first step is to perform an optimal calibration coefficient calculation for the leakage problem of the oscillator 22054 in the transmitting terminal 2204 of the transmitter 2200, and use the calibration coefficient obtained in the calibration coefficient calculating mode to perform a normal data transmitting operation. However, please note that the above embodiment is only for an illustrative purpose and is not meant to be a limitation of the present invention. In any case, various modifications and alterations of the device should fall into the disclosed scope of the present invention as long as the performances and functions disclosed by the present invention can be attained. For example, the first LPF 22046 and the second LPF 22048 in the transmitter 2200 also can be filters with other functions.

Specifically, the calibration point of this embodiment is to further add the calibrating unit 2202, and please note that the calibrating unit 2202 here for compensating the leakage of the oscillator 22054 is a little different from the X, Y structure of the calibrating unit 902 in FIG. 9 and the calibrating unit 1402 in FIG. 14 for calibrating IQ mismatch. In the transmitter 2200, an in-phase (I) signal path (i.e. a path passing by the first DAC 22042, the first LPF 22046, and the first mixer 22050 in the transmitting terminal 2204) and a quadrature (Q) signal path (i.e. a path passing by the second DAC 22044, the second LPF 22048, the second mixer 22052 in the transmitting terminal 2204) uses the adder 22024 and the adder 22026 in the calibrating unit 2202, respectively, and adds an oscillator leakage compensating value to establish a calibration model. However, please note that the above embodiment is only for an illustrative purpose and is not meant to be a limitation of the present invention. The determining method and details of the optimal oscillator leakage compensating value D will be described in detail in the following paragraphs.

Figure 19:
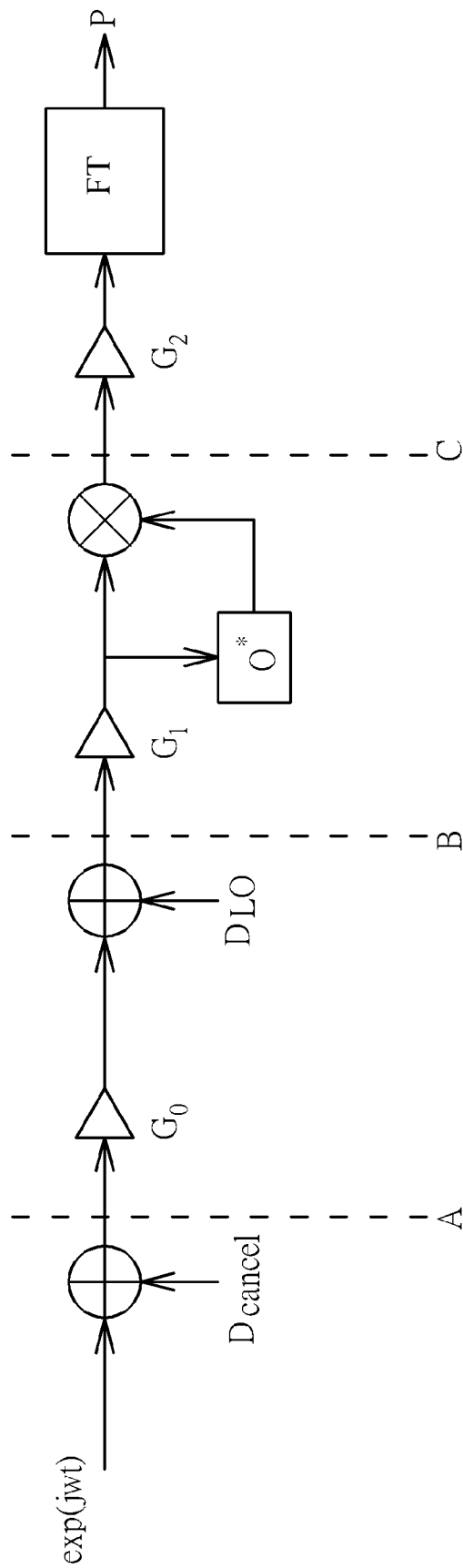
FIG. 19 is a block diagram of an equivalent baseband model of a transmitter of a Direct-Conversion transceiver.

Please refer to FIG. 19. FIG. 19 is a block diagram of an equivalent baseband model of the calibration apparatus as shown in FIG. 18. Based on this model as shown in FIG. 19, a complete mathematical analysis at A, B and C points with the input of a single frequency test signal of the frequency ω is respectively represented by the following formulas (18)-(20). The resulting P of FT performed on the signal of the C point at the frequency −w is also given by the formula (21).

$$A(t)=e^{jwt}+D_{cancel} \quad (18)$$

$$B(t)=G_0 e^{jwt}+(D_{LO}+G_0 D_{cancel}) \quad (19)$$

$$C(t)=DC+|G_1|^2 G_0(D^*_{LO}+G^*_0 D^*_{cancel})e^{jwt}+|G_1|^2 G^*_0 (D_{LO}+G_0 D_{cancel})e^{-jwt} \quad (20)$$

$$P=G_2|G_1|^2 G^*_0(D_{LO}+G_0 D_{cancel})=G(D'_{LO}+D_{cancel}) \quad (21)$$

$D_{cancel}$ is an oscillator leakage compensating value of the calibration circuit added for compensating the local oscillator leakage. $D_{LO}$ represents an oscillator leakage value. $G_0$ is a gain of the first DAC 22042/the second DAC 22044, and $G_1$ is a gain of the transmitting path, and $G_2$ is a gain between the mixer 2208 and the ADC 2210, wherein $G_0$, $G_1$, and $G_2$ are unknown. G is a total gain of the path from $G_0$ is a gain of the first DAC 22042/the second DAC 22044 to the ADC 2210, and $D'_{LO}$ is an equivalent value of $D_{LO}$ observed from the digital domain, and thus the formula (21) can be simplified to be:

$$P=G(D_{LO}+D_{cancel}) \quad (22)$$

Figure 20:
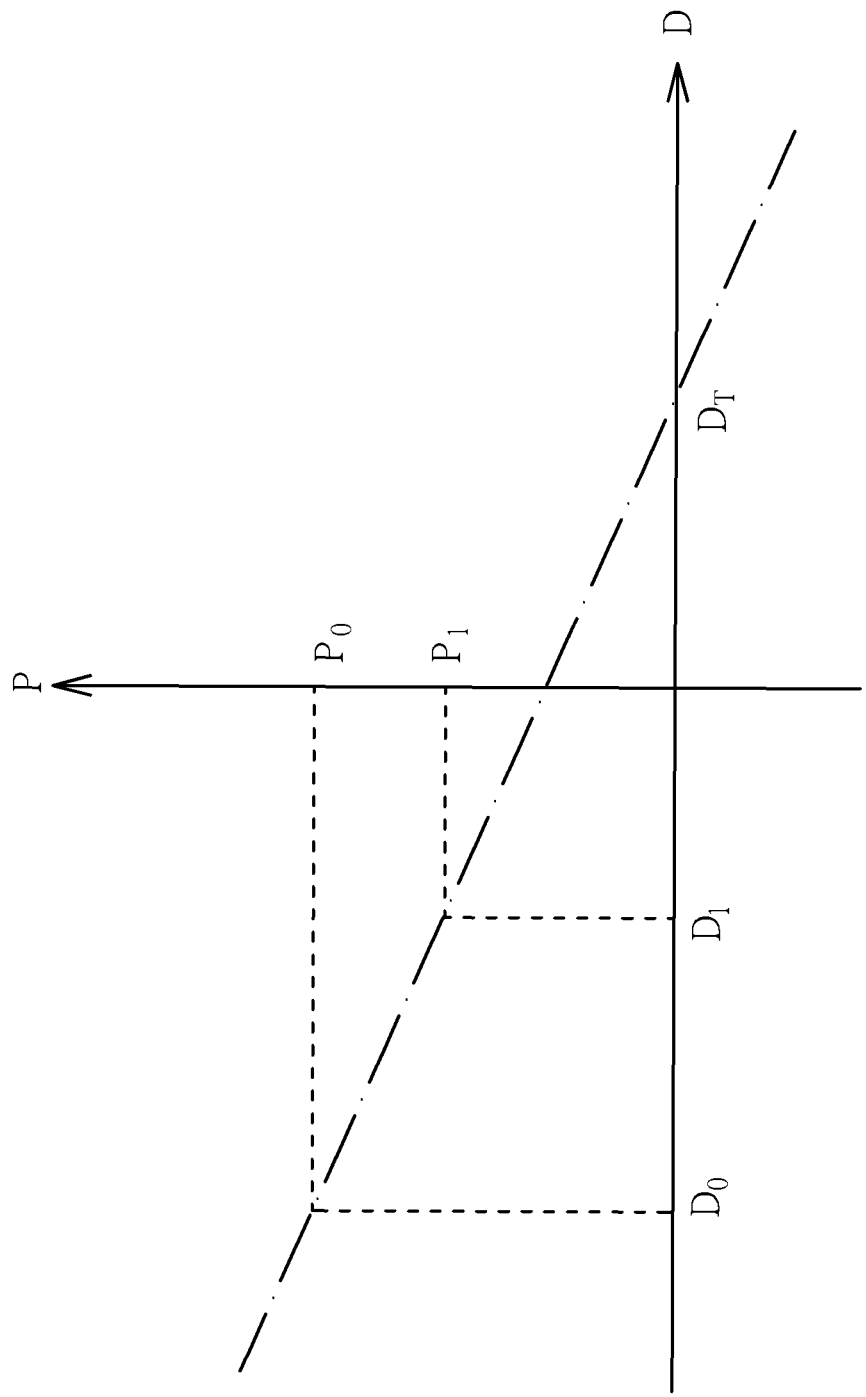
FIG. 20 is a diagram using the first predetermined oscillator leakage compensating value and the second predetermined oscillator leakage compensating value to obtain the optimal oscillator leakage compensating value.

According to the formula (22), since the oscillator leakage value $D_{LO}$ in the transmitting terminal 2204 is a fixed value, the converting result P obtained by performing FT at the frequency −w is a linear formula of the oscillator leakage compensating value $D_{cancel}$. That is, the oscillator leakage compensating value $D_{cancel}$ and the converting result P are linear dependent. Thus, in this embodiment, the control unit 2216 will generate a test signal and use a first predetermined oscillator leakage compensating value $D_0$ and a second predetermined oscillator leakage compensating value $D_1$ to put into the oscillator leakage compensating value D of the adder 22024 and the adder 22026 in the calibrating unit 2202, to make the compensated signal be observed in the baseband digital domain after passing by transmitting terminal 2204, the self-mixer 2208 and the ADC 2210, and use the spectrum analyzing unit 2212 to obtain a first converting result $P_0$ and a second converting result $P_1$. Since the above formula (22) is a linear formula, it is practical to solve this linear equation to obtain an optimal oscillator leakage compensating value $D_T$ from the first predetermined oscillator leakage compensating value $D_0$ and the second predetermined oscillator leakage compensating value $D_1$ and the respectively corresponding first converting result $P_0$ and the second converting result $P_1$, wherein a converting result $P_T$ corresponding to the optimal oscillator leakage compensating value $D_T$ is the smallest (i.e. the converting result $P_T=0$). In other words, the optimal oscillator leakage compensating value $D_T$ can be obtained by the theories of the linear extrapolation and the linear interpolation (depending on the relation between the first predetermined oscillator leakage compensating value $D_0$, the second predetermined oscillator leakage compensating value $D_1$, and the optimal oscillator leakage compensating value $D_T$). Please note that the first predetermined oscillator leakage compensating value $D_0$, the second predetermined oscillator leakage compensating value $D_1$ should be different values. FIG. 20 is a diagram using the first predetermined oscillator leakage compensating value and the second predetermined oscillator leakage compensating value to obtain the optimal oscillator leakage compensating value. Please note that the concept of the embodiment is simplified to be two dimensional for easy understanding, and in fact it is four dimensional. The first converting result $P_0$ in FIG. 18 is $G(D_{LO}+D_0)$, and the second converting result $P_1$ is $G(D_{LO}+D_1)$. The optimal oscillator leakage compensating value $D_T$ is the value completely eliminating the leakage value $D_{LO}$. That is, the optimal oscillator leakage compensating value $D_T=-D_{LO}$. After simplified, the following formula is obtained:

$$D_T = D_0 - \frac{D_1 - D_0}{P_1 - P_0} P_0 \qquad (23)$$

Figure 21:
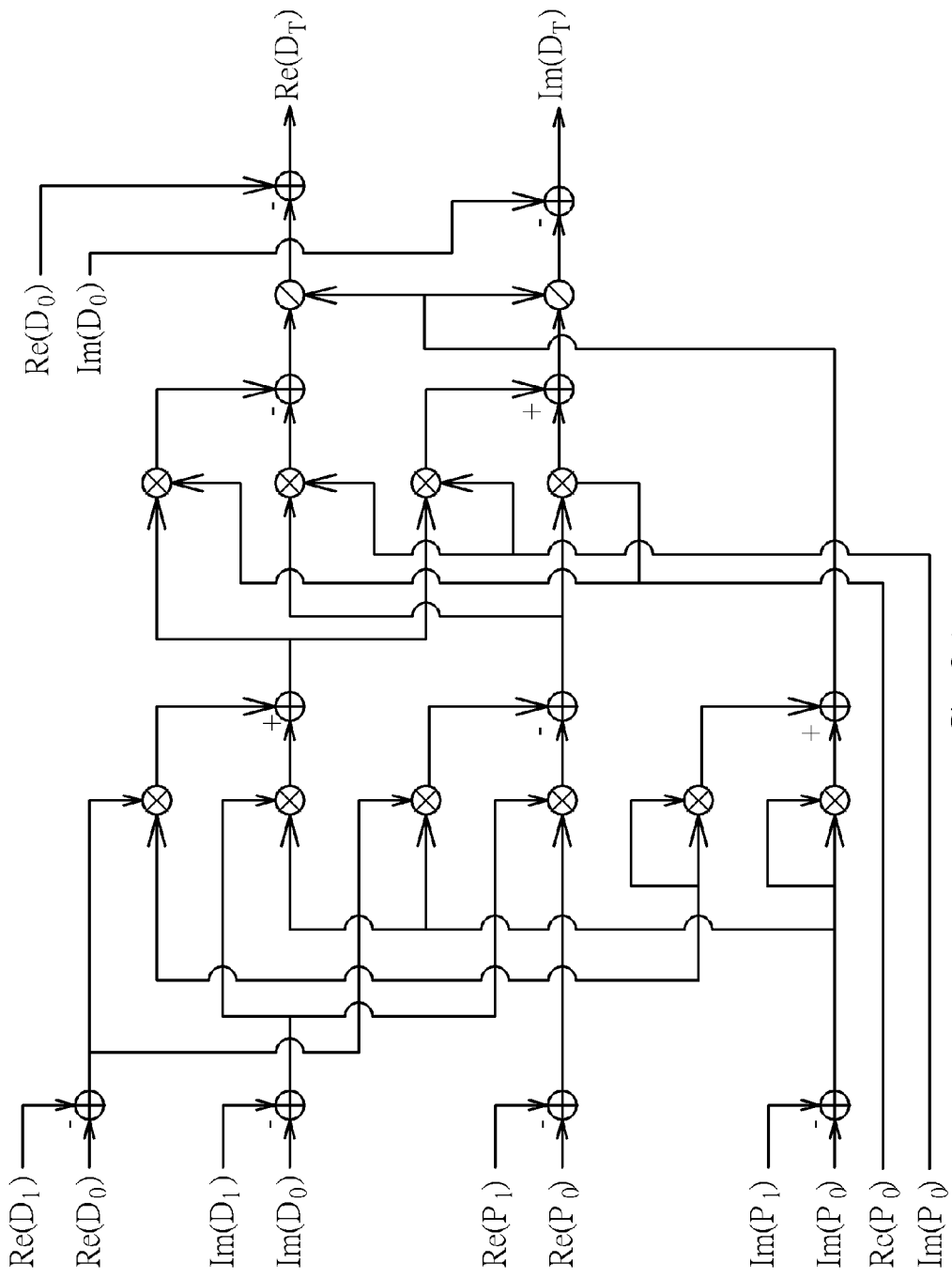
FIG. 21 is a diagram of a calibration coefficient calculating unit in accordance with another embodiment of the present invention.

FIG. 21 is a diagram of an exemplary circuit of a calibration coefficient calculating unit in accordance with an embodiment of the present invention, showing the circuit architecture details of the calibration coefficient calculating unit 2214 according to the formula (23).

Figure 22:
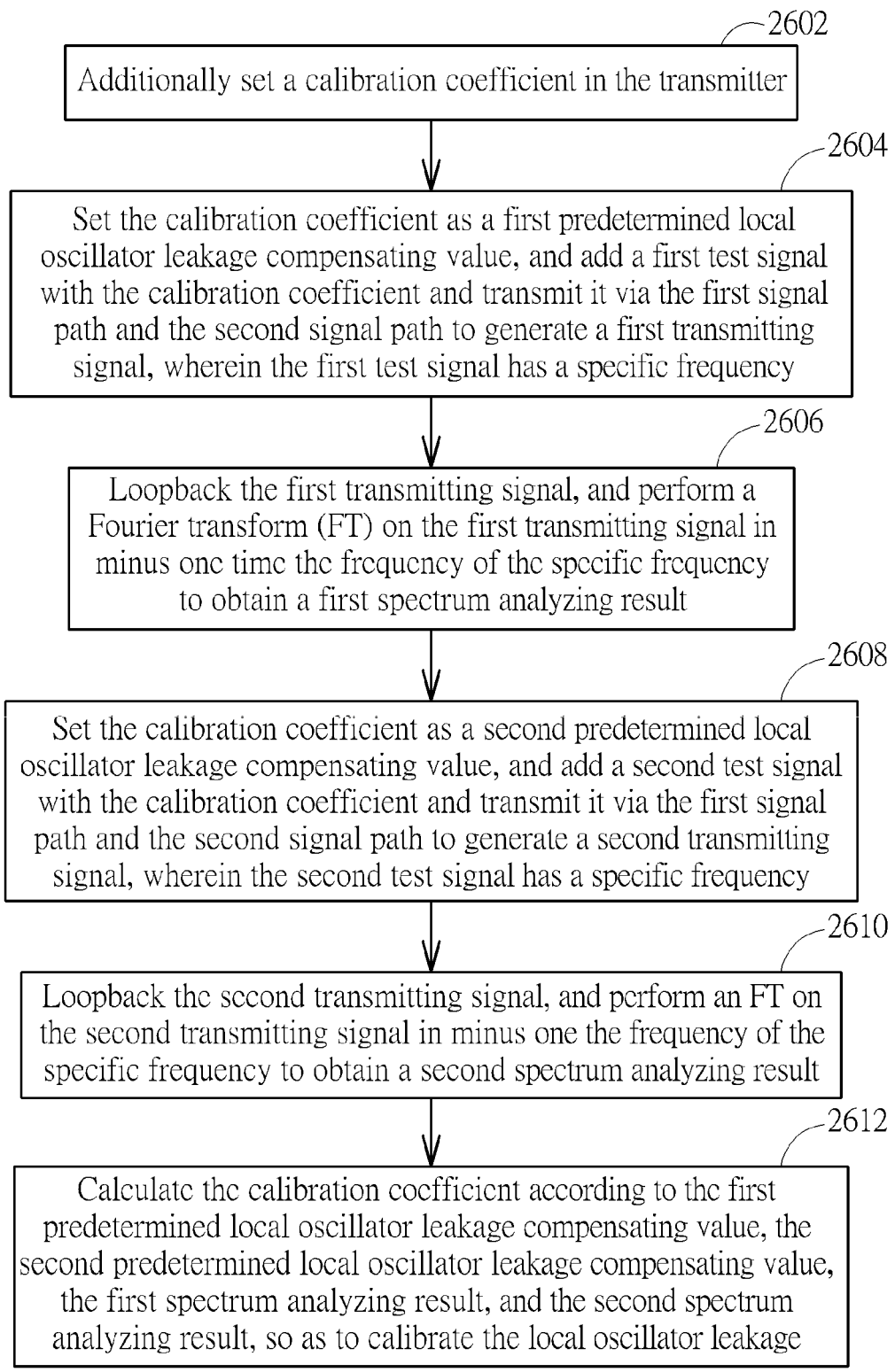
FIG. 22 shows an exemplary flowchart of an exemplary calibration method for calibrating leakage of an oscillator of a transmitter.

Please refer to FIG. 22. FIG. 22 shows an exemplary flowchart of an exemplary calibration method for calibrating leakage of an oscillator of a transmitter, wherein one of the first signal path and the second signal path is an in-phase signal path (I) and the other one of the first signal path and the second signal path is a quadrature signal path (Q). Provided that substantially the same result is achieved, the steps of the process flowchart do not have to be in the exact order shown in FIG. 22 and need not be contiguous, meaning that other steps can be intermediate. The calibration method in FIG. 22 can be applied to the transmitter 2200 in FIG. 22. The calibration method comprises the following steps:

Step 2602: Additionally set a calibration coefficient in the transmitter.

Step 2604: Set the calibration coefficient as a first predetermined local oscillator leakage compensating value, and add a first test signal with the calibration coefficient and transmit it via the first signal path and the second signal path to generate a first transmitting signal, wherein the first test signal has a specific frequency.

Step 2606: Loopback the first transmitting signal, and perform a Fourier transform (FT) on the first transmitting signal in minus one time the frequency of the specific frequency to obtain a first spectrum analyzing result.

Step 2608: Set the calibration coefficient as a second predetermined local oscillator leakage compensating value, and add a second test signal with the calibration coefficient and transmit it via the first signal path and the second signal path to generate a second transmitting signal, wherein the second test signal has a specific frequency.

Step 2610: Loopback the second transmitting signal, and perform an FT on the second transmitting signal in minus one the frequency of the specific frequency to obtain a second spectrum analyzing result.

Step 2612: Calculate the calibration coefficient according to the first predetermined local oscillator leakage compensating value, the second predetermined local oscillator leakage compensating value, the first spectrum analyzing result, and the second spectrum analyzing result, so as to calibrate the local oscillator leakage.

After the calibration flowchart of the Step 2602 to the Step 2612, the optimal values of the oscillator leakage compensating value $D_{cancel}$ can be obtained directly and accurately. On the other hand, the prior art has to approximate the correct values gradually, and thus calculating the optimal leakage compensating value by the present invention is faster than that by the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration method for calibrating a transmitter, wherein one of the first signal path and the second signal path is an in-phase signal path and the other one of the first signal path and the second signal path is a quadrature signal path, the calibration method comprising:

additionally setting at least a calibration coefficient in the transmitter;

setting the at least a calibration coefficient as at least a first eliminating value, and utilizing the transmitter to transmit a first test signal via the at least a calibration coefficient and via the first signal path and the second signal path to generate a first transmitting signal, wherein the first test signal has a specific frequency;

loopbacking the first transmitting signal, and performing a spectrum analyzing operation on the first transmitting signal to generate a first spectrum analyzing result;

setting the at least a calibration coefficient as at least a second eliminating value, and utilizing the transmitter to transmit a second test signal via the at least a calibration coefficient and via the first signal path and the second signal path to generate a second transmitting signal, wherein the second test signal has a specific frequency;

loopbacking the second transmitting signal, and performing a spectrum analyzing operation for the second transmitting signal to generate a second spectrum analyzing result; and calculating at least a target eliminating value according to the first eliminating value, the second eliminating value, the first spectrum analyzing result, and the second spectrum analyzing result, and setting the at least a calibration coefficient as the at least a target eliminating value;

wherein the at least a calibration coefficient is set as the at least a target eliminating value to calibrate the mismatches between the first signal path and the second signal path of the transmitter, and the at least a calibration coefficient only has a single calibration coefficient, and the step of utilizing the transmitter to transmit the first test signal via the at least a calibration coefficient and via the first signal path and the second signal path adds the first test signal with its complex conjugate multiplying the calibration coefficient and transmits it via the first signal path and the second signal path.

2. The calibration method of claim 1, wherein the at least a calibration coefficient only has a single calibration coefficient, and the step of utilizing the transmitter to transmit the second test signal via the at least a calibration coefficient and via the first signal path and the second signal path adds the second test signal with its complex conjugate multiplying the calibration coefficient and transmits it via the first signal path and the second signal path.

3. The calibration method of claim 1, wherein the step of performing the spectrum analyzing operation on the first transmitting signal to generate the first spectrum analyzing result and performing the spectrum analyzing operation on the second transmitting signal to generate the second spectrum analyzing result performs an FT on the first transmitting signal in plus/minus 2 times the frequency of the specific frequency to obtain the first spectrum analyzing result and performs an FT on the second transmitting signal in plus/minus 2 times the frequency of the specific frequency to obtain the second spectrum analyzing result.

4. The calibration method of claim 1, wherein the at least a calibration coefficient is set as the at least a target eliminating value to calibrate a local oscillator leakage of the transmitter.

5. The calibration method of claim 4, wherein the step of performing the spectrum analyzing operation on the first transmitting signal to generate the first spectrum analyzing result and performing the spectrum analyzing operation on the second transmitting signal to generate the second spectrum analyzing result performs an FT on the first transmitting signal in plus/minus 1 time the frequency of the specific frequency to obtain the first spectrum analyzing result and performs an FT on the second transmitting signal in plus/minus 1 time the frequency of the specific frequency to obtain the second spectrum analyzing result.

6. A calibration apparatus for calibrating a transmitter, wherein one of the first signal path and the second signal path is an in-phase signal path and the other one of the first signal path and the second signal path is a quadrature signal path, the calibration apparatus comprising:
  a calibrating unit, comprising at least a calibration coefficient;
  a control unit, for setting the at least a calibration coefficient as at least a first eliminating value, and utilizing the transmitter to transmit a first test signal via the at least a calibration coefficient and via the first signal path and the second signal path to generate a first transmitting signal, wherein the first test signal has a specific frequency, and setting the at least a calibration coefficient as at least a second eliminating value, and utilizing the transmitter to transmit a second test signal via the at least a calibration coefficient and via the first signal path and the second signal path to generate a second transmitting signal, wherein the second test signal has a specific frequency;
  a spectrum analyzing circuit, for performing a spectrum analyzing operation on the sent back first transmitting signal to generate a first spectrum analyzing result, and performing a spectrum analyzing operation on the sent back second transmitting signal to generate a second spectrum analyzing result; and
  a calibration coefficient calculating unit, for calculating at least a target eliminating value according to the first eliminating value, the second eliminating value, the first spectrum analyzing result, and the second spectrum analyzing result, and setting the at least a calibration coefficient as the at least a target eliminating value;
  wherein the at least a calibration coefficient is set as the at least a target eliminating value to calibrate the mismatches between the first signal path and the second signal path of the transmitter, the at least a calibration coefficient only has a single calibration coefficient, and the calibrating unit multiplies a first complex conjugate of the first test signal with the single calibration coefficient to generate a first result, and the calibrating unit further comprises:
    a first adder, for adding the first result with the first test signal.

7. The calibration apparatus of claim 6, wherein the calibrating unit further multiplies a second complex conjugate of the second test signal with the single calibration coefficient to generate a second result, and the calibrating unit further comprises:
    a second adder, for adding the second result with the second test signal.

8. The calibration apparatus of claim 6, wherein the spectrum analyzing circuit performs an FT on the sent back first transmitting signal in plus/minus 2 times the frequency of the specific frequency to obtain the first spectrum analyzing result and performs an FT on the sent back second transmitting signal in plus/minus 2 times the frequency of the specific frequency to obtain the second spectrum analyzing result.

9. The calibration apparatus of claim 6, wherein the calibration coefficient calculating unit sets the at least a calibration coefficient as the at least a target eliminating value to calibrate a local oscillator leakage of the transmitter.

10. The calibration apparatus of claim 9, wherein the spectrum analyzing circuit performs an FT on the sent back first transmitting signal in plus/minus 1 time the frequency of the specific frequency to obtain the first spectrum analyzing result and performs an FT on the sent back second transmitting signal in plus/minus 1 time the frequency of the specific frequency to obtain the second spectrum analyzing result.

* * * * *